(12) United States Patent
Sharma et al.

(10) Patent No.: US 10,938,686 B2
(45) Date of Patent: Mar. 2, 2021

(54) SYSTEMS AND METHODS FOR ANALYZING DIGITAL USER EXPERIENCE

(71) Applicant: Zscaler, Inc., San Jose, CA (US)

(72) Inventors: Dhawal Sharma, San Jose, CA (US); KD Mazboudi, San Jose, CA (US); Srikanth Devarajan, San Jose, CA (US); Chakkaravarthy Periyasamy Balaiah, San Jose, CA (US); Sreedhar Pampati, San Jose, CA (US); Amit Sinha, San Jose, CA (US)

(73) Assignee: Zscaler, Inc., San Jose, CA (US)

(*) Notice: Subject to any disclaimer, the term of this patent is extended or adjusted under 35 U.S.C. 154(b) by 0 days.

(21) Appl. No.: 16/284,106

(22) Filed: Feb. 25, 2019

(65) Prior Publication Data

US 2020/0274784 A1     Aug. 27, 2020

(51) Int. Cl.
*G06F 15/173*     (2006.01)
*H04L 12/26*     (2006.01)

(52) U.S. Cl.
CPC .......... *H04L 43/062* (2013.01); *H04L 43/045* (2013.01); *H04L 43/065* (2013.01); *H04L 43/0805* (2013.01); *H04L 43/0829* (2013.01)

(58) Field of Classification Search
CPC ... H04L 43/062; H04L 43/045; H04L 43/065; H04L 43/0805; H04L 43/0829
USPC .................. 709/224–226, 217, 223
See application file for complete search history.

(56) References Cited

U.S. PATENT DOCUMENTS

| | | |
|---|---|---|
| 7,756,826 B2 | 7/2010 | Bots et al. |
| 8,259,571 B1 | 9/2012 | Raphel et al. |
| 8,429,111 B1 | 4/2013 | Kailash et al. |
| 8,458,789 B1 | 6/2013 | Kailash et al. |
| 8,464,335 B1 | 6/2013 | Sinha et al. |
| 8,887,249 B1 | 11/2014 | Schekochikhin et al. |
| 9,060,239 B1 | 6/2015 | Sinha et al. |
| 9,369,433 B1 | 6/2016 | Paul et al. |
| 9,569,195 B2 | 2/2017 | Schekochikhin et al. |
| 9,654,507 B2 | 5/2017 | Gangadharappa et al. |
| 10,007,699 B2 | 6/2018 | Pangeni et al. |

(Continued)

OTHER PUBLICATIONS

Rodden, Kerry, Hilary Hutchinson, and Xin Fu. "Measuring the user experience on a large scale: user-centered metrics for web applications." In Proceedings of the SIGCHI conference on human factors in computing systems, pp. 2395-2398. 2010. (Year: 2010).*

*Primary Examiner* — Liang Che A Wang
(74) *Attorney, Agent, or Firm* — Clements Bernard Walker; Lawrence A. Baratta, Jr.; Jacob P. Beers

(57) ABSTRACT

Systems and methods for analyzing digital user experience include performing inline monitoring of network access between one or more users each with an associated user device executing an agent application, the Internet, and one or more cloud applications and private applications accessible via lightweight connectors; based on user experience metrics collected by the inline monitoring and stored in a logging analysis system, obtaining user experience metrics for one or more users for a given time epoch and for a given application; determining a user experience score for the one or more users for the given time epoch and for the given application based on the obtained user experience metrics; and providing a graphical user interface displaying data related to various user experience scores for various users over various time epochs with various applications.

20 Claims, 26 Drawing Sheets

(56) References Cited

U.S. PATENT DOCUMENTS

| | | |
|---|---|---|
| 2009/0300045 A1 | 12/2009 | Chaudhry et al. |
| 2010/0125903 A1 | 5/2010 | Devarajan et al. |
| 2010/0175134 A1 | 7/2010 | Ali-Ahmad et al. |
| 2011/0167474 A1 | 7/2011 | Sinha et al. |
| 2012/0072985 A1* | 3/2012 | Davne ................ H04L 63/0272 |
| | | 726/22 |
| 2013/0291087 A1 | 10/2013 | Kailash et al. |
| 2013/0339514 A1* | 12/2013 | Crank ................ H04L 63/1416 |
| | | 709/224 |
| 2014/0026179 A1 | 1/2014 | Devarajan et al. |
| 2015/0310334 A1* | 10/2015 | Huang ................... H04L 41/16 |
| | | 706/12 |
| 2015/0326613 A1 | 11/2015 | Devarajan et al. |
| 2016/0048558 A1 | 2/2016 | Kailash et al. |
| 2016/0335686 A1* | 11/2016 | AthuluruTlrumala ....................... |
| | | G06F 3/0482 |
| 2017/0090760 A1 | 3/2017 | Kalipatnapu et al. |
| 2017/0142068 A1* | 5/2017 | Devarajan ............. H04L 67/146 |
| 2017/0223029 A1 | 8/2017 | Sharma et al. |
| 2018/0011855 A1* | 1/2018 | Shuvali .............. G06Q 30/0282 |

* cited by examiner

FIG. 11

| 45 LOCATIONS | SCORE | USERS |
|---|---|---|
| └→ NEW YORK | | |
|     └→ 10th STREET — | 76 | 784 |
|     └→ ACME CORP — | 89 | UNKNOWN |
|     └→ FIN DISTRICT — | (49) | 280 |
|     ⋮ | | |
| └→ NEW JERSEY | | |
|     └→ TOWN (8th FLOOR) — | 76 | 600 |
|     └→ CALDWELL — | 94 | 400 |
| └→ CAMDEN — | (34) | 700 |
| └→ ROAD WARRIOR — | 84 | 2,600 |

FIG. 12

FIN DISTRICT
TOTAL USERS – 280
↓ (31)

TODAY ▽    USER ▽
WEEK            APP
MONTH         DEVICE

| USER | SCORE | %CHANGE | IMPACTED APPS |
|---|---|---|---|
| MANOJ | 36 | +46 | O365, BOX |
| JAY | 64 | +11 | O365 |
| AMIT | 75 | +5 | -NONE- |
| BILL | 16 | -80 | O365 |
| JOE | 25 | +50 | O365 |
| ⋮ | | | |

SYSTEMS AND METHODS FOR ANALYZING DIGITAL USER EXPERIENCE

FIELD OF THE DISCLOSURE

The present disclosure generally relates to computer networking systems and methods. More particularly, the present disclosure relates to systems and methods for monitoring, analyzing, and improving digital user experience.

BACKGROUND OF THE DISCLOSURE

Generally, User Experience (UX or UEX) seeks to quantify an individual user's satisfaction with a product or service such as a networking application. In networking, End User Experience Monitoring (EUEM) tools conventionally focus on observations, i.e., tests, instead of monitoring, i.e., continuous feedback. For example, conventional EUEM tools focus on page load and response time over Hypertext Transfer Protocol (HTTP). While this approach can provide insight, there are limitations as these measurements may vary by time of day, location, etc., provide little input into remedial actions, are reactive and merely snapshots in time, etc. Network Performance Monitoring and Diagnostics Market (NPMD) tools allow for Information Technology (IT) operations to understand the performance of applications, the network and infrastructure components via network instrumentation. Additionally, these tools provide insight into the quality of end user experience. The goal of NPMD products is not only to monitor the network components to facilitate outage and degradation resolution but also to identify performance optimization opportunities. This is conducted via diagnostics, analytics, and debugging capabilities to complement additional monitoring of today's complex IT environments. Application Performance Monitoring (APM) is the monitoring and management of performance and availability of software applications. APM strives to detect and diagnose complex application performance problems to maintain an expected level of service.

Digital Experience Monitoring (DEM) goes beyond APM and EUEM. EUEM looks specifically at the human end-user or customer interaction with an application. APM focuses on the performance and availability of the application. DEM is the experience of all digital agents—human and machine—as they interact with enterprises' application and service portfolios. A problem with conventional DEM is the inability to obtain end-to-end data. Conventional DEM dataset sources include lightweight instrumentation of devices and endpoints, JavaScript injected web pages (Server side), network-extracted packets and flows (client side), synthetic transaction executions, Application Programming Interfaces (APIs) and social media feeds, etc. The lightweight instrumentation can include Web-page-injected snippets such as JavaScript code acting as mini-agents that capture and send data from an endpoint once a Web page has been rendered. Packet capture applications can include both custom hardware and software-based components that capture packets from the network and interpret protocol information. Operating System (OS)-resident agents can capture and send data directly from the endpoint or device. Synthetic transactions can be run as tests to obtain results for applications, services, or digital business processes. Finally, social-media-based information (including sentiment data), collective intelligence benchmarking, and API data feeds are being added to the DEM ingestion level.

Disadvantageously, the above approaches for data gathering for DEM are all reactive in the sense these techniques are implemented periodically or on demand. This is not real-time, continuous data that actually reflects the user's actual experiences, but rather reflects a synthetic transaction or a snapshot in time that may infer actual digital experience. For effective DEM, it is necessary to continuously capture data related to an end-to-end application including availability, latency, quality, etc. for monitoring, analyzing, and improving digital user experience. Stated differently, the conventional approaches include passive performance monitoring using techniques such as traffic sniffing and injection or active performance monitoring with a synthetic approach where network probes are used to simulate traffic. However, neither of these capture actual user experience.

BRIEF SUMMARY OF THE DISCLOSURE

Systems and methods for monitoring digital user experience include performing inline monitoring of network access between one or more users each with an associated user device executing an agent application, the Internet, and one or more cloud applications and private applications accessible via lightweight connectors; responsive to a user executing a specific application, obtaining device and application metrics for the user from the associated user device related to usage of specific application; obtaining network metrics from the cloud system related to network performance of the specific application; and providing the device and application metrics and the network metrics to a logging and analytics system for quantifying digital user experience of the specific application.

Systems and methods for analyzing digital user experience include performing inline monitoring of network access between one or more users each with an associated user device executing an agent application, the Internet, and one or more cloud applications and private applications accessible via lightweight connectors; based on user experience metrics collected by the inline monitoring and stored in a logging analysis system, obtaining user experience metrics for one or more users for a given time epoch and for a given application; determining a user experience score for the one or more users for the given time epoch and for the given application based on the obtained user experience metrics; and providing a graphical user interface displaying data related to various user experience scores for various users over various time epochs with various applications.

Systems and methods for improving digital user experience include performing inline monitoring of network access between one or more users each with an associated user device executing an agent application, the Internet, and one or more cloud applications and private applications accessible via lightweight connectors; obtaining user experience scores for any of a user, a group of users, a location, and an organization from the inline monitoring or from the logging and analytics system; responsive to a low user experience, analyzing the low user experience score to determine one or more likely factors; and causing one or more remedial actions to address the low user experience score based on the one or more likely factors.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 11-24 are various screenshots of a Graphical User Interface (GUI) associated with the analysis service to display, report, and provide a drill-down of the User Experience (UEX) scores;

DETAILED DESCRIPTION OF THE DISCLOSURE

The present disclosure relates to systems and methods for monitoring, analyzing, and improving digital user experience. The systems and methods provide experience monitoring in the context of Software-as-a-Service (SaaS) and the cloud, including end user experience monitoring, network/server/endpoint monitoring, cloud application performance monitoring (e.g., Azure, AWS, GCP), SaaS application performance monitoring (GCP, Office 365, Salesforce, Skype), Voice over Internet Protocol (VOIP) and other real-time application performance monitoring, Web performance monitoring, etc.

The systems and methods include a digital experience monitoring platform which does not require new hardware or software in the network. Rather, the digital experience monitoring platform leverages an existing cloud infrastructure, namely a distributed security cloud, lightweight connectors at the edge for access to applications, and an application at endpoints such as user devices. Such components are already in place in Zscaler's distributed security cloud. Also, these components perform inline processing, enabling a real-time collection of data for the digital experience monitoring platform. Advantageously, by leveraging existing infrastructure, the digital experience monitoring platform provides real-time data which can be used for remediation and requires no additional equipment. For example, the digital experience monitoring platform can enable an intelligent path selection in real-time for a user. Thus, the digital experience monitoring platform is proactive, not reactive.

Aspects of the digital experience monitoring platform include monitoring Internet traffic, destination monitoring, tunnel monitoring, health monitoring for the cloud, etc. This can include endpoint metrics, Service Layer Agreement (SLA) monitoring, Anomaly detection/Security Operations Center (SOC) Integration, topology mapping, packet captures and flow-based monitoring, User Experience (UEX) Score, Infrastructure-as-a-Service (IaaS) monitoring/integration, change monitoring, Autonomous System (AS) monitoring, third-party network monitoring, etc.

The objective here is proactive, not reactive, monitoring of end users to detect, as early as possible, issues that impact true user experience and productivity such as to identify root cause of performance issues with actionable insights for remediation. This is performed by correlating user performance in the context of network metrics, application metrics, and endpoint device metrics.

§ 1.0 Example High-Level System Architecture—Cloud-Based Security System

Figure 1:
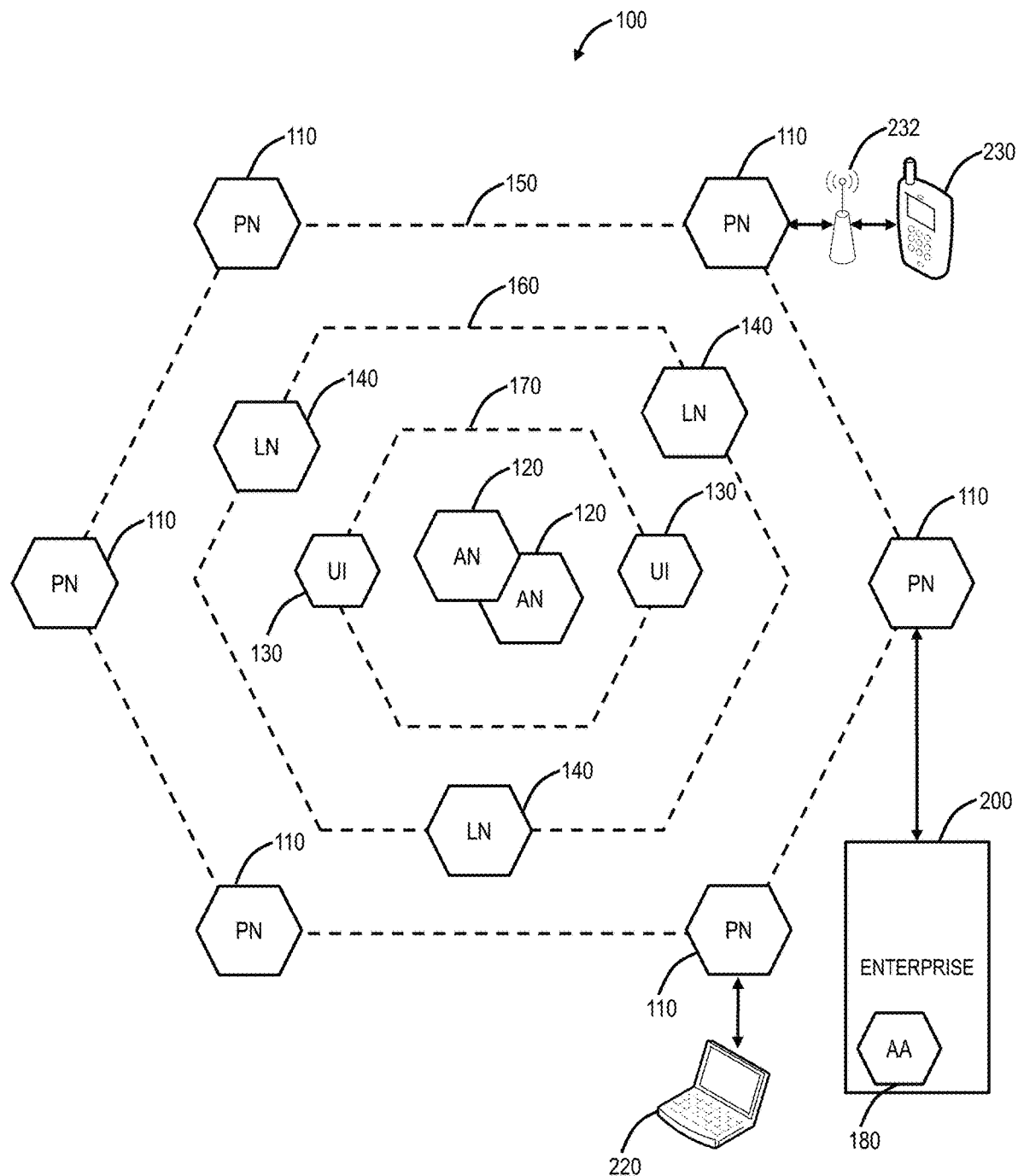
FIG. 1 is a network diagram of a distributed security system.

FIG. 1 is a block diagram of a distributed security system 100. The system 100 may, for example, be implemented as an overlay network in a Wide Area Network (WAN), such as the Internet, a Local Area Network (LAN), or the like. The system 100 includes Processing Nodes (PN) 110, that proactively detect and preclude the distribution of security threats, e.g., malware, spyware, viruses, email spam, Data Loss Prevention (DLP), content filtering, etc., and other undesirable content sent from or requested by an external system. The processing nodes 110 can also log activity and enforce policies, including logging changes to the various components and settings in the system 100. Example external systems may include an enterprise or external system 200, a computer device 220, and a mobile device 230, or other network and computing systems communicatively coupled to the system 100 including Internet of Things (IoT) devices.

In an embodiment, each of the processing nodes 110 may include a decision system, e.g., data inspection engines that operate on a content item, e.g., a web page, a file, an email message, or some other data or data communication that is sent from or requested by one of the external systems. In an embodiment, all data destined for or received from the Internet is processed through one of the processing nodes 110. In another embodiment, specific data specified by each external system, e.g., only email, only executable files, etc., is process through one of the processing node 110.

Each of the processing nodes 110 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the processing node 110 may allow distribution of the content item, preclude distribution of the content item, allow distribution of the content item after a cleaning process, or perform threat detection on the content item. In an embodiment, the actions taken by one of the processing nodes 110 may be determinative on the threat classification of the content item and on a security policy of the external system to which the content item is being sent from or from which the content item is being requested by. A content item is violating if, for any part $C=[c_1, c_2, \ldots, c_m]$ of the content item, at any of the processing nodes 110, any one of the data inspection engines generates an output that results in a classification of "violating."

Figure 3:
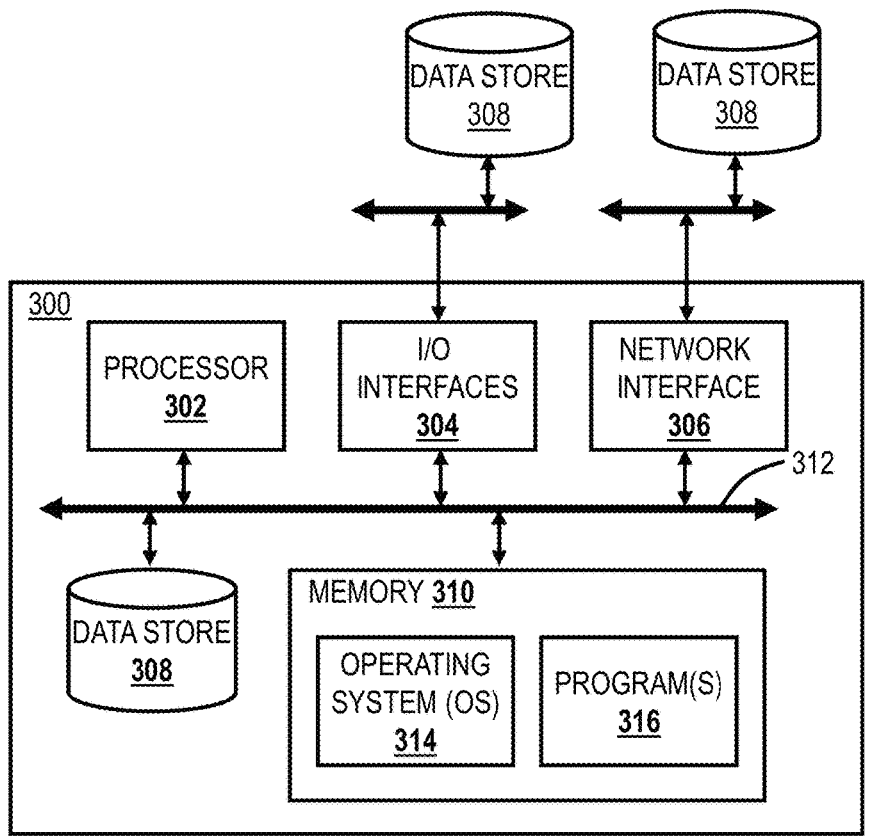
FIG. 3 is a block diagram of a server which may be used in the distributed security system of FIG. 1 or with any other cloud-based system.

Each of the processing nodes 110 may be implemented by one or more computer and communications devices, e.g., server computers, gateways, routers, switches, etc., such as the server 300 described in FIG. 3. In an embodiment, the processing nodes 110 may serve as an access layer 150. The access layer 150 may, for example, provide external system access to the security system 100. In an embodiment, each of the processing nodes 110 may include Internet gateways and one or more servers, and the processing nodes 110 may be distributed through a geographic region, e.g., throughout a country, region, campus, etc. According to a service agreement between a provider of the system 100 and an owner of an external system, the system 100 may thus provide security protection to the external system at any location throughout the geographic region.

Data communications may be monitored by the system 100 in a variety of ways, depending on the size and data requirements of the external system. For example, an enterprise 200 may have multiple routers, switches, etc. that are used to communicate over the Internet, and the routers, switches, etc. may be configured to establish communications through the nearest (in traffic communication time, for example) processing node 110. A mobile device 230 may be configured to communicate to the nearest processing node 110 through any available wireless access device, such as an access point, or a cellular gateway. A single computer device 220, such as a consumer's personal computer, may have its browser and email program configured to access the nearest processing node 110, which, in turn, serves as a proxy for the computer device 220. Alternatively, an Internet provider may have all of its customer traffic processed through the processing nodes 110.

In an embodiment, the processing nodes 110 may communicate with one or more authority nodes (AN) 120. The authority nodes 120 may store policy data for each external system and may distribute the policy data to each of the processing nodes 110. The policy may, for example, define security policies for a protected system, e.g., security policies for the enterprise 200. Example policy data may define access privileges for users, websites and/or content that is disallowed, restricted domains, etc. The authority nodes 120 may distribute the policy data to the processing nodes 110. In an embodiment, the authority nodes 120 may also distribute threat data that includes the classifications of content items according to threat classifications, e.g., a list of known viruses, a list of known malware sites, spam email domains, a list of known phishing sites, etc. The distribution of threat data between the processing nodes 110 and the authority nodes 120 may be implemented by push and pull distribution schemes described in more detail below. In an embodiment, each of the authority nodes 120 may be implemented by one or more computer and communication devices, e.g., server computers, gateways, switches, etc., such as the server 300 described in FIG. 3. In some embodiments, the authority nodes 120 may serve as an application layer 170. The application layer 170 may, for example, manage and provide policy data, threat data, and data inspection engines and dictionaries for the processing nodes 110.

Other application layer functions may also be provided in the application layer 170, such as a user interface (UI) front-end 130. The user interface front-end 130 may provide a user interface through which users of the external systems may provide and define security policies, e.g., whether email traffic is to be monitored, whether certain websites are to be precluded, etc. Another application capability that may be provided through the user interface front-end 130 is security analysis and log reporting. The underlying data on which the security analysis and log reporting functions operate are stored in logging nodes (LN) 140, which serve as a data logging layer 160. Each of the logging nodes 140 may store data related to security operations and network traffic processed by the processing nodes 110 for each external system. In an embodiment, the logging node 140 data may be anonymized so that data identifying an enterprise is removed or obfuscated. For example, identifying data may be removed to provide an overall system summary of security processing for all enterprises and users without revealing the identity of any one account. Alternatively, identifying data may be obfuscated, e.g., provide a random account number each time it is accessed, so that an overall system summary of security processing for all enterprises and users may be broken out by accounts without revealing the identity of any one account. In another embodiment, the identifying data and/or logging node 140 data may be further encrypted, e.g., so that only the enterprise (or user if a single user account) may have access to the logging node 140 data for its account. Other processes of anonymizing, obfuscating, or securing logging node 140 data may also be used. Note, as described herein, the systems and methods for tracking and auditing changes in a multi-tenant cloud system can be implemented in the data logging layer 160, for example.

In an embodiment, an access agent 180 may be included in the external systems. For example, the access agent 180 is deployed in the enterprise 200. The access agent 180 may, for example, facilitate security processing by providing a hash index of files on a client device to one of the processing nodes 110, or may facilitate authentication functions with one of the processing nodes 110, e.g., by assigning tokens for passwords and sending only the tokens to a processing node so that transmission of passwords beyond the network edge of the enterprise is minimized. Other functions and processes may also be facilitated by the access agent 180. In an embodiment, the processing node 110 may act as a forward proxy that receives user requests to external servers addressed directly to the processing node 110. In another embodiment, the processing node 110 may access user requests that are passed through the processing node 110 in a transparent mode. A protected system, e.g., enterprise 200, may, for example, choose one or both of these modes. For example, a browser may be configured either manually or through the access agent 180 to access the processing node 110 in a forward proxy mode. In the forward proxy mode, all accesses are addressed to the processing node 110.

In an embodiment, an enterprise gateway may be configured so that user requests are routed through the processing node 110 by establishing a communication tunnel between enterprise gateway and the processing node 110. For establishing the tunnel, existing protocols such as generic routing encapsulation (GRE), layer two tunneling protocol (L2TP), Internet Protocol Security (IPSec), Datagram Transport Layer Security (DTLS), or other tunneling and encapsulation techniques designed for an Internet Protocol (IP)-based underlay data plane (IP) security protocols may be used. In another embodiment, the processing nodes 110 may be deployed at Internet service provider (ISP) nodes. The ISP nodes may redirect subject traffic to the processing nodes 110 in a transparent proxy mode. Protected systems, such as the enterprise 200, may use a multiprotocol label switching (MPLS) class of service for indicating the subject traffic that is to be redirected. For example, at the within the enterprise, the access agent 180 may be configured to perform MPLS labeling. In another transparent proxy mode embodiment, a protected system, such as the enterprise 200, may identify the processing node 110 as a next hop router for communication with the external servers.

Generally, the distributed security system 100 may generally refer to a cloud-based security system. Other cloud-based security systems and generalized cloud-based systems are contemplated for the systems and methods for tracking and auditing changes in a multi-tenant cloud system. Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's device, with no installed client version of an application required. Centralization gives cloud service providers complete control over the versions of the browser-based applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The distributed security system 100 is illustrated herein as one embodiment of a cloud-based system, and those of ordinary skill in the art will recognize the tracking and auditing systems and methods contemplate operation on any cloud-based system.

An example of the distributed security system 100 is the Zscaler cloud where the processing nodes 110 are referred to as Zscaler Enforcement Nodes (ZEN) and the authority nodes 120 are referred to as Central Authority (CA) nodes. In a practical embodiment, there can be many more processing nodes 110 relative to the authority nodes 120.

§ 2.0 Example Detailed System Architecture and Operation

Figure 2:
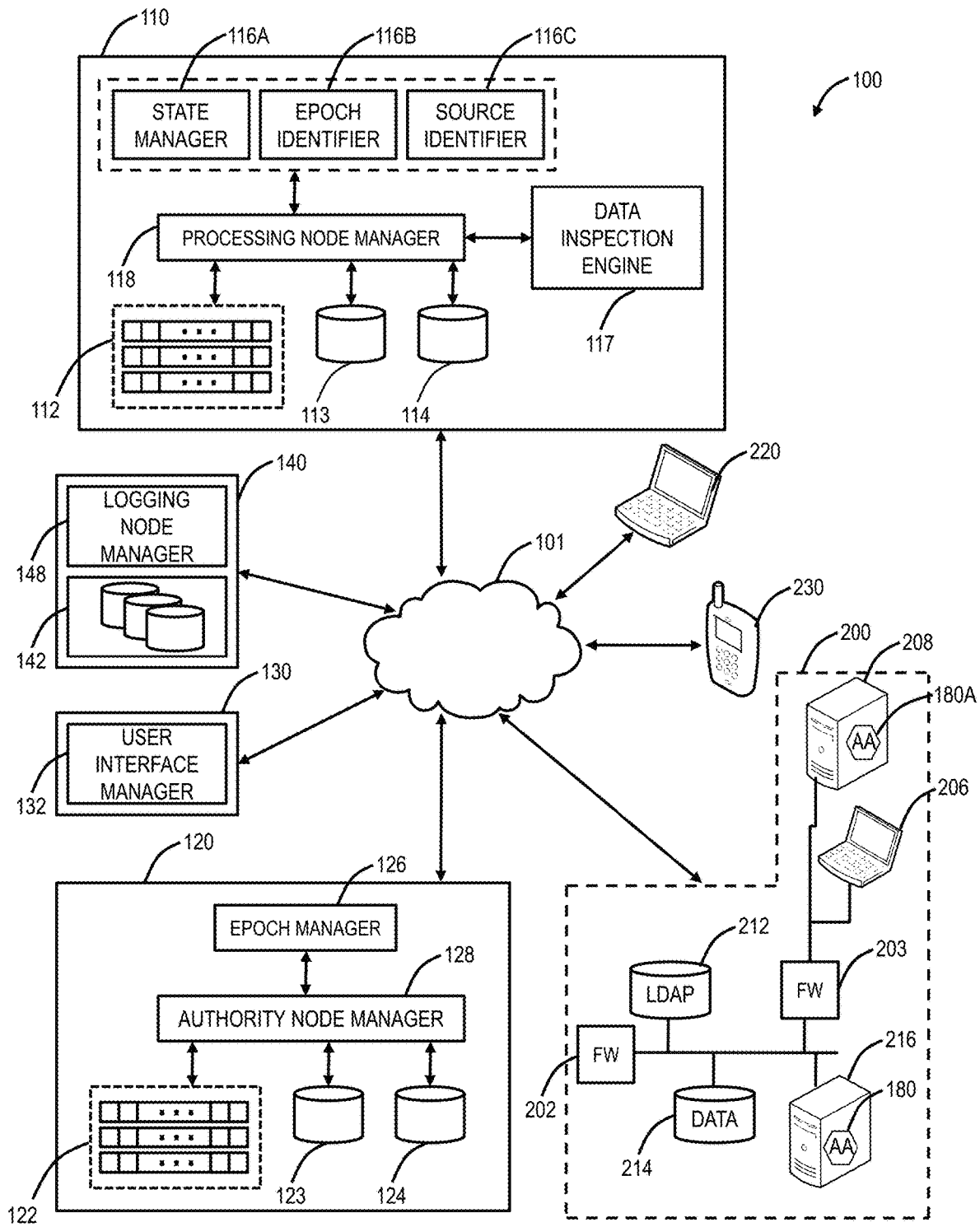
FIG. 2 is a network diagram of the distributed security system of FIG. 1 illustrating various components in more detail.

FIG. 2 is a block diagram of various components of the distributed security system 100 in more detail. Although FIG. 2 illustrates only one representative component processing node 110, authority node 120 and logging node 140, those of ordinary skill in the art will appreciate there may be many of each of the component nodes 110, 120 and 140 present in the system 100. A wide area network (WAN) 101, such as the Internet, or some other combination of wired and/or wireless networks, communicatively couples the processing node 110, the authority node 120, and the logging node 140 to one another. The external systems 200, 220 and 230 likewise communicate over the WAN 101 with each other or other data providers and publishers. Some or all of the data communication of each of the external systems 200, 220 and 230 may be processed through the processing node 110.

FIG. 2 also shows the enterprise 200 in more detail. The enterprise 200 may, for example, include a firewall (FW) 202 protecting an internal network that may include one or more enterprise servers 216, a Lightweight Directory Access Protocol (LDAP) server 212, and other data or data stores 214. Another firewall 203 may protect an enterprise subnet that can include user computers 206 and 208 (e.g., laptop and desktop computers). The enterprise 200 may communicate with the WAN 101 through one or more network devices, such as a router, gateway, switch, etc. The LDAP server 212 may store, for example, user login credentials for registered users of the enterprise 200 system. Such credentials may include user identifiers, login passwords, and a login history associated with each user identifier. The other data stores 214 may include sensitive information, such as bank records, medical records, trade secret information, or any other information warranting protection by one or more security measures.

In an embodiment, a client access agent 180a may be included on a client computer 206. The client access agent 180a may, for example, facilitate security processing by providing a hash index of files on the user computer 206 to a processing node 110 for malware, virus detection, etc. Other security operations may also be facilitated by the access agent 180a. In another embodiment, a server access agent 180 may facilitate authentication functions with the processing node 110, e.g., by assigning tokens for passwords and sending only the tokens to the processing node 110 so that transmission of passwords beyond the network edge of the enterprise 200 is minimized. Other functions and processes may also be facilitated by the server access agent 180b. The computer device 220 and the mobile device 230 may also store information warranting security measures, such as personal bank records, medical information, and login information, e.g., login information to the computers 206 of the enterprise 200, or to some other secure data provider server. The computer device 220 and the mobile device 230 can also store information warranting security measures, such as personal bank records, medical information, and login information, e.g., login information to a server 216 of the enterprise 200, or to some other secure data provider server.

§ 2.1 Example Processing Node Architecture

In an embodiment, the processing nodes 110 are external to network edges of the external systems 200, 220 and 230. Each of the processing nodes 110 stores security policy data 113 received from the authority node 120 and monitors content items requested by or sent from the external systems 200, 220 and 230. In an embodiment, each of the processing nodes 110 may also store a detection process filter 112 and/or threat data 114 to facilitate the decision of whether a content item should be processed for threat detection. A processing node manager 118 may manage each content item in accordance with the security policy data 113, and the detection process filter 112 and/or threat data 114, if stored at the processing node 110, so that security policies for a plurality of external systems in data communication with the processing node 110 are implemented external to the network edges for each of the external systems 200, 220 and 230. For example, depending on the classification resulting from the monitoring, the content item may be allowed, precluded, or threat detected. In general, content items that are already classified as "clean" or not posing a threat can be allowed, while those classified as "violating" may be precluded. Those content items having an unknown status, e.g., content items that have not been processed by the system 100, may be threat detected to classify the content item according to threat classifications.

The processing node 110 may include a state manager 116A. The state manager 116A may be used to maintain the authentication and the authorization states of users that submit requests to the processing node 110. Maintenance of the states through the state manager 116A may minimize the number of authentication and authorization transactions that are necessary to process a request. The processing node 110 may also include an epoch processor 116B. The epoch processor 116B may be used to analyze authentication data that originated at the authority node 120. The epoch processor 116B may use an epoch ID to validate further the authenticity of authentication data. The processing node 110 may further include a source processor 116C. The source processor 116C may be used to verify the source of authorization and authentication data. The source processor 116C may identify improperly obtained authorization and authentication data, enhancing the security of the network. Collectively, the state manager 116A, the epoch processor 116B, and the source processor 116C operate as data inspection engines.

Because the amount of data being processed by the processing nodes 110 may be substantial, the detection processing filter 112 may be used as the first stage of an information lookup procedure. For example, the detection processing filter 112 may be used as a front-end to a look-up of the threat data 114. Content items may be mapped to index values of the detection processing filter 112 by a hash function that operates on an information key derived from the information item. The information key is hashed to generate an index value (i.e., a bit position). A value of zero in a bit position in the guard table can indicate, for example, the absence of information, while a one in that bit position can indicate the presence of information. Alternatively, a one could be used to represent absence, and a zero to represent presence. Each content item may have an information key that is hashed. For example, the processing node manager 118 may identify the Uniform Resource Locator (URL) address of URL requests as the information key and hash the URL address; or may identify the file name and the file size of an executable file information key and hash the file name and file size of the executable file. Hashing an information key to generate an index and checking a bit value at the index in the detection processing filter 112 generally requires less processing time than actually searching threat data 114. The use of the detection processing filter 112 may improve the failure query (i.e., responding to a request for absent information) performance of database queries and/or any general information queries. Because data structures are generally optimized to access information that is present in the structures, failure query performance has a greater effect on the time required to process information searches for very rarely occurring items, e.g., the presence of file information in a virus scan log or a cache where many or most of the files transferred in a network have not been scanned or cached, using the detection processing filter 112. However, the worst case additional cost is only on the order of one, and thus its use for most failure queries saves on the order of m log m, where m is the number of information records present in the threat data 114.

The detection processing filter 112 thus improves the performance of queries where the answer to a request for information is usually positive. Such instances may include, for example, whether a given file has been virus scanned, whether content at a given URL has been scanned for inappropriate (e.g., pornographic) content, whether a given fingerprint matches any of a set of stored documents, and whether a checksum corresponds to any of a set of stored documents. Thus, if the detection processing filter 112 indicates that the content item has not been processed, then a worst-case null lookup operation into the threat data 114 is avoided, and a threat detection can be implemented immediately. The detection processing filter 112 thus complements the threat data 114 that capture positive information. In an embodiment, the detection processing filter 112 may be a Bloom filter implemented by a single hash function. The Bloom filter may be sparse table, i.e., the tables include many zeros and few ones, and the hash function is chosen to minimize or eliminate false negatives which are, for example, instances where an information key is hashed to a bit position, and that bit position indicates that the requested information is absent when it is actually present.

§ 2.2 Example Authority Node Architecture

In general, the authority node 120 includes a data store that stores master security policy data 123 for each of the external systems 200, 220 and 230. An authority node manager 128 may be used to manage the master security policy data 123, e.g., receive input from users of each of the external systems defining different security policies and may distribute the master security policy data 123 to each of the processing nodes 110. The processing nodes 110 then store a local copy of the security policy data 113. The authority node 120 may also store a master detection process filter 122. The detection processing filter 122 may include data indicating whether content items have been processed by one or more of the data inspection engines 116 in any of the processing nodes 110. The authority node manager 128 may be used to manage the master detection processing filter 122, e.g., receive updates from processing nodes 110 when the processing node 110 has processed a content item and update the master detection processing filter 122. For example, the master detection processing filter 122 may be distributed to the processing nodes 110, which then store a local copy of the detection processing filter 112.

In an embodiment, the authority node 120 may include an epoch manager 126. The epoch manager 126 may be used to generate authentication data associated with an epoch ID. The epoch ID of the authentication data is a verifiable attribute of the authentication data that can be used to identify fraudulently created authentication data. In an embodiment, the detection processing filter 122 may be a guard table. The processing node 110 may, for example, use the information in the local detection processing filter 112 to quickly determine the presence and/or absence of information, e.g., whether a particular URL has been checked for malware; whether a particular executable has been virus scanned, etc. The authority node 120 may also store master threat data 124. The master threat data 124 may classify content items by threat classifications, e.g., a list of known viruses, a list of known malware sites, spam email domains, list of known or detected phishing sites, etc. The authority node manager 128 may be used to manage the master threat data 124, e.g., receive updates from the processing nodes 110 when one of the processing nodes 110 has processed a content item and update the master threat data 124 with any pertinent results. In some implementations, the master threat data 124 may be distributed to the processing nodes 110, which then store a local copy of the threat data 114. In another embodiment, the authority node 120 may also monitor the health of each of the processing nodes 110, e.g., the resource availability in each of the processing nodes 110, detection of link failures, etc. Based on the observed health of each of the processing nodes 110, the authority node 120 may redirect traffic among the processing nodes 110 and/or balance traffic among the processing nodes 110. Other remedial actions and processes may also be facilitated by the authority node 120.

§ 2.3 Example Processing Node and Authority Node Communications

The processing node 110 and the authority node 120 may be configured according to one or more push and pull processes to manage content items according to security policy data 113 and/or 123, detection process filters 112 and/or 122, and the threat data 114 and/or 124. In a threat data push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data 114, then the processing node manager 118 may cause one or more of the data inspection engines 117 to perform the threat detection processes to classify the content item according to a threat classification. Once the content item is classified, the processing node manager 118 generates a threat data update that includes data indicating the threat classification for the content item from the threat detection process and transmits the threat data update to an authority node 120.

The authority node manager 128, in response to receiving the threat data update, updates the master threat data 124 stored in the authority node data store according to the threat data update received from the processing node 110. In an embodiment, the authority node manager 128 may automatically transmit the updated threat data to the other processing nodes 110. Accordingly, threat data for new threats as the new threats are encountered are automatically distributed to each processing node 110. Upon receiving the new threat data from the authority node 120, each of processing node managers 118 may store the updated threat data in the locally stored threat data 114.

In a threat data pull and push implementation, each of the processing nodes 110 stores policy data 113 and threat data 114. The processing node manager 118 determines whether a content item requested by or transmitted from an external system is classified by the threat data 114. If the content item is determined to be classified by the threat data 114, then the processing node manager 118 may manage the content item according to the security classification of the content item and the security policy of the external system. If, however, the content item is determined not to be classified by the threat data, then the processing node manager 118 may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data store. If responsive threat data is stored in the master threat data 124, then the authority node manager 128 provide a reply that includes the responsive threat data to the processing node 110 so that the processing node manager 118 may manage the content item in accordance with the security policy data 113 and the classification of the content item. Conversely, if the authority node manager 128 determines that responsive threat data is not stored in the master threat data 124, then the authority node manager 128 may provide a reply that does not include the responsive threat data to the processing node 110. In response, the processing node manager 118 can cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to an authority node 120. The authority node manager 128 can then update the master threat data 124. Thereafter, any future requests related to responsive threat data for the content item from other processing nodes 110 can be readily served with responsive threat data.

In a detection process filter and threat data push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 may be implemented to ensure that a false positive has not occurred. The initial check of the detection process filter 112, however, may eliminate many null queries to the threat data 114, which, in turn, conserves system resources and increases efficiency. If the content item is classified by the threat data 114, then the processing node manager 118 may manage the content item in accordance with the security policy data 113 and the classification of the content item. Conversely, if the processing node manager 118 determines that the content item is not classified by the threat data 114, or if the processing node manager 118 initially determines through the detection process filter 112 that the content item is not classified by the threat data 114, then the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to one of the authority nodes 120.

The authority node manager 128, in turn, may update the master threat data 124 and the master detection process filter 122 stored in the authority node data store according to the threat data update received from the processing node 110. In an embodiment, the authority node manager 128 may automatically transmit the updated threat data and detection processing filter to other processing nodes 110. Accordingly, threat data and the detection processing filter for new threats as the new threats are encountered are automatically distributed to each processing node 110, and each processing node 110 may update its local copy of the detection processing filter 112 and threat data 114.

In a detection process filter and threat data pull and push implementation, each of the processing nodes 110 stores a detection process filter 112, policy data 113, and threat data 114. The processing node manager 118 accesses the detection process filter 112 to determine whether the content item has been processed. If the processing node manager 118 determines that the content item has been processed, it may determine if the content item is classified by the threat data 114. Because the detection process filter 112 has the potential for a false positive, a lookup in the threat data 114 can be implemented to ensure that a false positive has not occurred. The initial check of the detection process filter 112, however, may eliminate many null queries to the threat data 114, which, in turn, conserves system resources and increases efficiency. If the processing node manager 118 determines that the content item has not been processed, it may request responsive threat data for the content item from the authority node 120. Because processing a content item may consume valuable resource and time, in some implementations the processing node 110 may first check with the authority node 120 for threat data 114 before committing such processing resources.

The authority node manager 128 may receive the responsive threat data request from the processing node 110 and may determine if the responsive threat data is stored in the authority node data 120 store. If responsive threat data is stored in the master threat data 124, then the authority node manager 128 provides a reply that includes the responsive threat data to the processing node 110 so that the processing node manager 118 can manage the content item in accordance with the security policy data 112 and the classification of the content item, and further update the local detection processing filter 112. Conversely, if the authority node manager 128 determines that responsive threat data is not stored in the master threat data 124, then the authority node manager 128 may provide a reply that does not include the responsive threat data to the processing node 110. In response, the processing node manager 118 may cause one or more of the data inspection engines 116 to perform the threat detection processes to classify the content item according to a threat classification. Once the content item is classified, the processing node manager 118 generates a threat data update that includes data indicating the threat classification for the content item from the threat detection process and transmits the threat data update to an authority node 120. The authority node manager 128 may then update the master threat data 124. Thereafter, any future requests for related to responsive threat data for the content item from other processing nodes 110 can be readily served with responsive threat data.

The various push and pull data exchange processes provided above are example processes for which the threat data and/or detection process filters may be updated in the system 100 of FIGS. 1 and 2. Other update processes, however, are contemplated herein. The data inspection engines 116, processing node manager 118, authority node manager 128, user interface manager 132, logging node manager 148, and authority agent 180 may be realized by instructions that upon execution cause one or more processing devices to carry out the processes and functions described above. Such instructions can, for example, include interpreted instructions, such as script instructions, e.g., JavaScript or ECMAScript instructions, or executable code, or other instructions stored in a non-transitory computer-readable medium. Other processing architectures can also be used, e.g., a combination of specially designed hardware and software, for example.

§ 3.0 Example Server Architecture

FIG. 3 is a block diagram of a server 300 which may be used in the system 100, in other systems, or standalone. Any of the processing nodes 110, the authority nodes 120, and the logging nodes 140 may be formed through one or more servers 300. Further, the computer device 220, the mobile device 230, the servers 208, 216, etc. may include the server 300 or similar structure. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 3 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touchpad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate over a network, such as the Internet, the WAN 101, the enterprise 200, and the like, etc. The network interface 306 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally, in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

§ 4.0 Example Mobile Device Architecture

Figure 4:
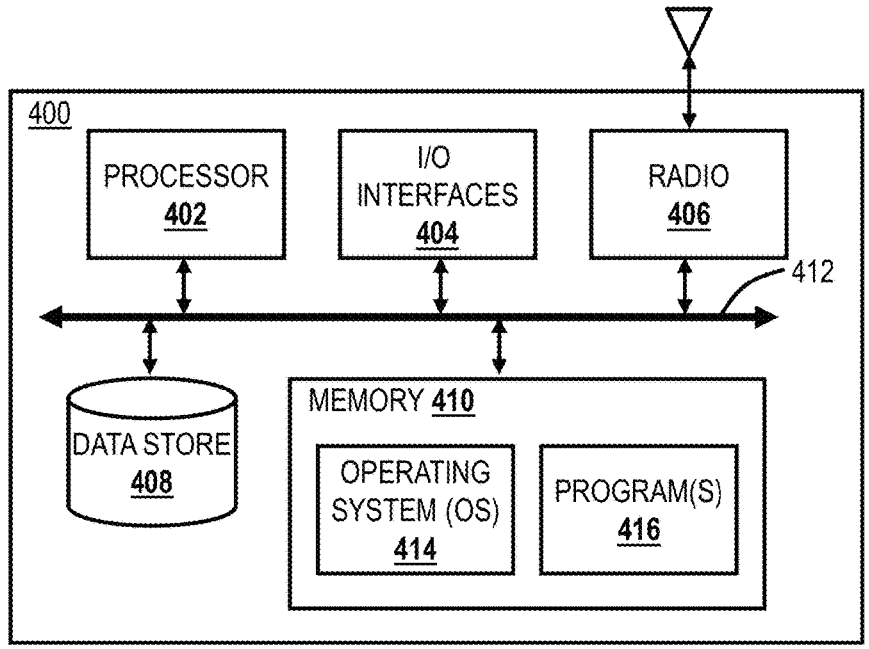
FIG. 4 is a block diagram of a mobile device which may be used in the system of FIG. 1 or with any other cloud-based system.

FIG. 4 is a block diagram of a mobile device 400, which may be used in the system 100 or the like. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 4 depicts the mobile device 400 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example, but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 400, a semiconductor-based microprocessor (in the form of a microchip or chip set), or generally any device for executing software instructions. When the mobile device 400 is in operation, the processor 402 is configured to execute software stored within the memory 410, to communicate data to and from the memory 410, and to generally control operations of the mobile device 400 pursuant to the software instructions. In an embodiment, the processor 402 may include an optimized mobile processor such as optimized for power consumption and mobile applications. The I/O interfaces 404 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 400. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 4, the software in the memory 410 includes a suitable operating system (O/S) 414 and programs 416. The operating system 414 essentially controls the execution of other computer programs and provides scheduling, input-output control, file and data management, memory management, and communication control and related services. The programs 416 may include various applications, add-ons, etc. configured to provide end-user functionality with the mobile device 400. For example, example programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

§ 5.0 Example General Cloud System

Figure 5:
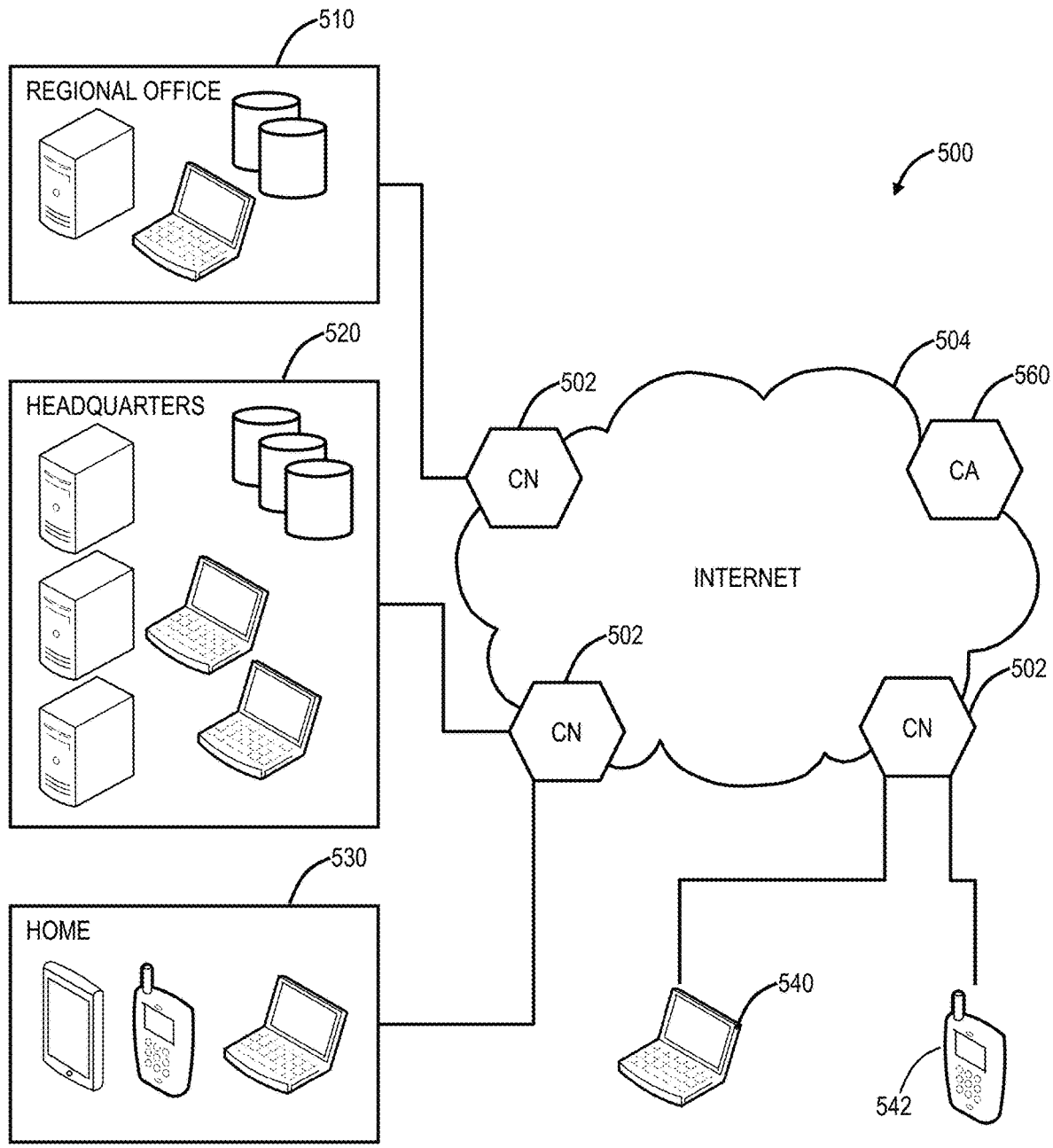
FIG. 5 is a network diagram of a generalized cloud-based system.
Figure 6:
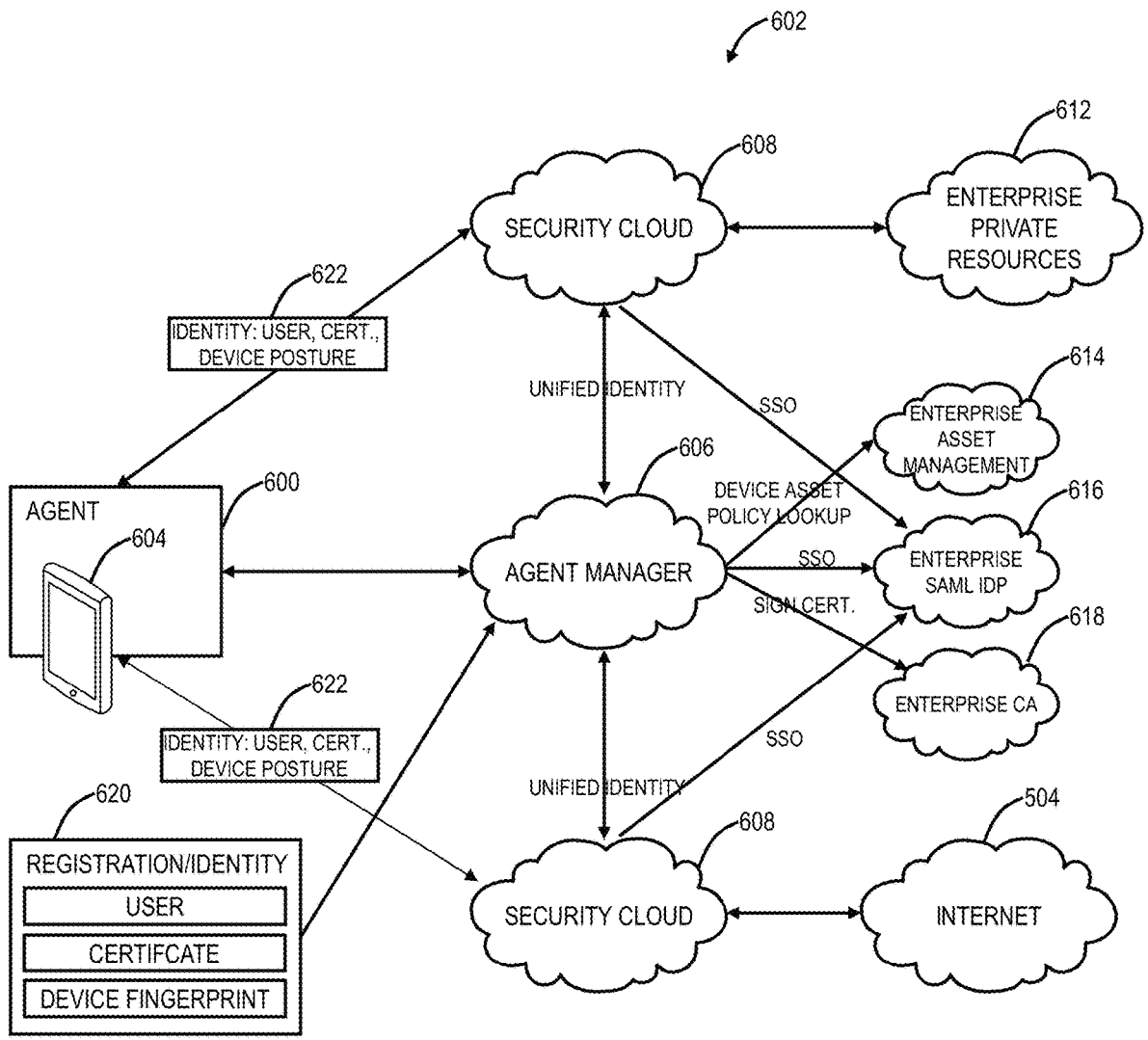
FIG. 6 is a network diagram of a unified agent application and associated connectivity and functionality in a network.

FIG. 5 is a block diagram of a cloud system 500 for implementing the systems and methods described herein. The cloud system 500 includes one or more cloud nodes (CN) 502 communicatively coupled to the Internet 504. The cloud nodes 502 may include the processing nodes 110, the server 300, or the like. That is, the cloud system 500 may include the distributed security system 100 or another implementation of a cloud-based system, such as a system providing different functionality from security. In the cloud system 500, traffic from various locations (and various devices located therein) such as a regional office 510, headquarters 520, various employee's homes 530, mobile laptop 540, and mobile device 542 communicates to the cloud through the cloud nodes 502. That is; each of the locations 510, 520, 530, 540, 542 is communicatively coupled to the Internet 504 through the cloud nodes 502. For security, the cloud system 500 may be configured to perform various functions such as spam filtering, uniform resource locator (URL) filtering, antivirus protection, bandwidth control, data loss prevention, zero-day vulnerability protection, web 2.0 features, and the like. In an embodiment, the cloud system 500 and the distributed security system 100 may be viewed as Security-as-a-Service through the cloud. In general, the cloud system 500 can be configured to perform any function in a multi-tenant environment. For example, the cloud system 500 can provide content, a collaboration between users, storage, application hosting, and the like.

In conjunction with the cloud system 500 and/or the distributed security system 100, various techniques can be used for monitoring which is described on a sliding scale between always inline to never inline. First, in an always inline manner, all user traffic is between inline proxies such as the processing nodes 110 or the cloud nodes 502 without exception. Second, in a somewhat always inline manner, all user traffic except for certain business partners or third parties is between inline proxies such as the processing nodes 110 or the cloud nodes 502. Third, in an inline manner for most traffic, high bandwidth applications can be configured to bypass the inline proxies such as the processing nodes 110 or the cloud nodes 502. Example high bandwidth applications can include content streaming such as video (e.g., Netflix, Hulu, YouTube, etc.) or audio (e.g., Pandora, etc.). Fourth, in a mixed manner, inline monitoring can be used for "interesting" traffic as determined by security policy with other traffic being direct. Fifth, in an almost never inline manner, simple domain-level URL filtering can be used to determine what is monitored inline.

§ 6.0 Unified Agent Application

Figure 7:
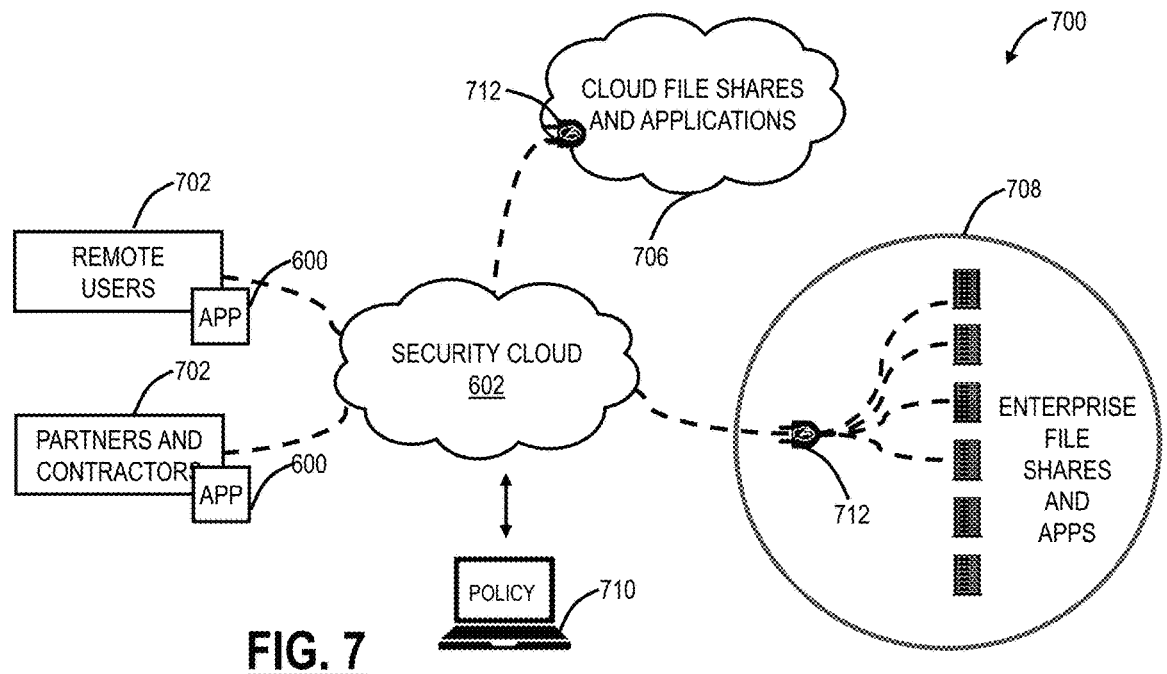
FIG. 7 is a network diagram of a virtual private access network using the security cloud.

FIG. 7 is a network diagram of a unified agent application 600 and associated connectivity and functionality in a security cloud 602. The unified agent application 600 is executed on a mobile device 604. The unified agent application 600 dynamically learns all available services, adapts to changing network environments, and provides a seamless and a secure network resource access to Internet and darknet hosted applications. This is achieved through dynamic evaluation of network conditions, enrollment to individual services, learning individual service protocols, creating a link-local network on the device 604, and establishing multiple secure tunnels to cloud services over this local network.

The unified agent application 600 is communicatively coupled to an agent manager cloud 606, and a security cloud 608. Note, the security cloud 608 can be the distributed security system 100, the cloud system 500, etc. The unified agent application 600 enables communication to enterprise private resources 612 via the security cloud 608 and to the Internet 504 via the security cloud 608. The agent manager cloud 606 can communicate with enterprise asset management 614, an enterprise Security Assertion Markup Language (SAML) Identity provider (IDP) 616, and an enterprise Certificate Authority (CA) 618. The device 604 and the unified agent application 600 can perform a registration/identity 620 process through the agent manager cloud 606 where the user identity, the user's certificates, and a device fingerprint can uniquely identify the device 604. Once registered, the unified agent application 600 has an identity 622 which can include the user, certificates, device posture, etc. and which is shared with the security cloud 608.

The unified agent application 600 operates on a client-server model where an IT admin enables appropriate services for end users at a Cloud Administration Server (CAS) which can be part of an agent manager cloud 606, namely the enterprise asset management 614. Every client can make a unicast request to the agent manager cloud 606 (e.g., CAS) to discover all enabled services. On acknowledging the response, the client issues a request to authenticate to each service's cloud Identity Providers, the enterprise SAML IDP 616. Authentication can be multi-factor depending upon the nature of the service. On successful authentication, server contacts Mobile Device Management (MDM) or Inventory management provider to define access control rights for the device 604. Post authorization, the device 604 is successfully enrolled into the agent manager cloud 606 which tracks and monitors all behavior of the device 604.

Post-enrollment, the device 604 creates a link local network with a specific IP configuration, opens a virtual network interface to read and write packets and opens multiple listening sockets at custom ports to create secure tunnels to available services through the security cloud 608. On network changes, the device 604 dynamically evaluates reachability to preconfigured domains and depending upon the result it appropriately transitions all network tunnels, thus providing a seamless experience to the end user. Further, the device 604 also intelligently learns the conditions which are appropriate for setting up network tunnels to cloud services depending upon several network heuristics such as reachability to a particular cloud service.

§ 6.1 Unified Agent Application—Functionality

The unified agent application 600 enable a user to connect to multiple cloud services through the dynamic discovery of available services followed by authentication and access as exposed in the corresponding service protocol. The unified agent application 600 addressed the unmanageable growth of mobility and cloud-based services which have led to a proliferation of individual applications for access to individual services. The unified agent application 600 can be implemented through a mobile application ("app") which overcomes the hassle of deploying and managing several applications across a gamut of mobile devices, operating systems, and mobile networks to gain secure access to the cloud-based internet or intranet resources. The mobile application can uniquely perform a Dynamic evaluation of Network and Service Discovery, Unified Enrollment to all services, Application dependent service enablement, Service protocol learning, Service Availability through secure network traffic forwarding tunnels, and the like.

Again, enterprises have a strong need to provide secure access to cloud services to its end users. The growth of mobility and cloud in the IT enterprise has made it impossible for IT admins to deploy individual applications for individual services. The mobile app associated with the systems and methods overcomes these limitations through the dynamic discovery of available services to the end user, followed by authentication and access to individual services. Further, the mobile app insightfully learns the protocol for each service and establishes a secure tunnel to the service. In essence, the mobile app is one app that an enterprise may use to provide secure connectivity to the Internet and diversified internal corporate applications. At the time of user enrollment, the mobile app will discover all services provided by the enterprise cloud and will enroll the user to all of those services. It will then set up secure tunnels for each application depending upon whether the application is internet bound or if it is internal to the corporate network (intranet).

The mobile app will also discover all applications provided within the enterprise cloud along with a Global Virtual Private Network (GVPN) service and show the available services to end user. Endpoint Applications today provide one service for a specific network function (such as Virtual Private Network (VPN) to a corporate network, web security, antivirus to access the Internet). The mobile app can be used to enable all these services with single enrollment. The mobile app will provide services to darknet applications along with securing the Internet traffic. The mobile app can set up a local network on the mobile device.

Generally, the unified agent application 600 support two broad functional categories—1) dynamic service discovery and access controls and 2) service availability. The dynamic service discovery and access controls include service configuration by the administrator, service discovery by the device 604, service acknowledgment and authentication, service authorization and enrollment, and the like. For service configuration by the administrator, the IT admin can provide cloud service details at a centralized knowledge server, such as part of the agent manager cloud 606, the enterprise asset management 614, etc. The cloud service details include the service type (e.g., Internet/intranet), network protocol, identity provider, server address, port and access controls, etc.

For service discovery by the device 604, the device 604 can issue a network request to a known Cloud Administrative Server (CAS) in the agent manager cloud 606 to discover all enabled services for a user. If a specific cloud server is not known a priori, the device 604 can broadcast the request to multiple clouds, e.g., through the agent manager cloud 606 communicating to the enterprise asset management 614, the enterprise SAML IDP 616, and the enterprise CA 618.

For the service acknowledgment and authentication, the device 604 acknowledges the response of service discovery and initiates the authentication flow. The device 604 learns the authentication protocol through the service discovery configuration and performs authentication of a configured nature at the enterprise SAML IDP 616. For the service authorization and enrollment, post successful authentication, the CAS, authorizes the device 604 and fetches the access control information by contacting a MDM/Inventory Solutions Provider. Depending upon the user context and the nature of access, the CAS enrolls the device 604 into several cloud services and informs the cloud services that the user has been enrolled for access.

The service availability includes link local network setup, a traffic interceptor, and dynamic traffic forwarding tunnels to authorized services. The link local network setup, post enrollment, has the device 604 create a local network on the device 604 itself to manage various networking functionalities. For the traffic interceptor, the device 604 intercepts and evaluates all Internet traffic. Allowed traffic is tunneled to the cloud services such as in the security cloud 608 whereas rest of the traffic is denied as per enterprise policies. For the dynamic traffic forwarding tunnels to authorized services, depending upon the evaluation, the device 604 splits the traffic into the different tunnel to individual cloud services such as in the security cloud 608.

The unified agent application 600 is a single application that provides security connectivity to the Internet 504 and darknet hosted applications, such as the enterprise private resources 612. The unified agent application 600 communicates securely to the agent manager 606 which is controlled by an IT admin. The unified agent application 600 learns available services and authenticates with each service. Post proper enrollment, the unified agent application 600 securely connects to cloud services by means of network tunnels.

§ 7.0 Virtual Private Access

Figure 8:
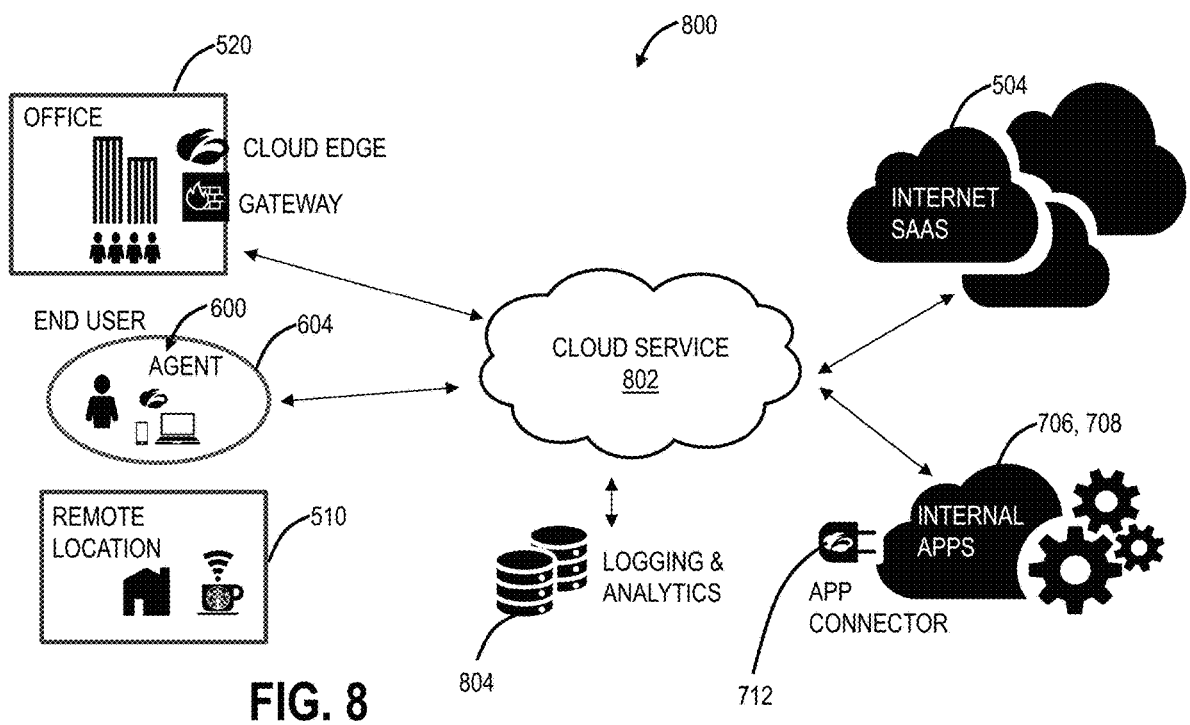
FIG. 8 is a network diagram of a cloud system for digital experience monitoring; 1

FIG. 8 is a network diagram of a virtual private access network 700 using the security cloud 602. Of note, while described with reference to the security cloud 602, virtual private access is also contemplated in the distributed security system 100, the cloud system 500, or any other distributed system. The virtual private access network 700 includes users 702 with an application 600 on their associated user devices (phones, tablets, laptops, etc.). The users 702 can be remote users, partners, contractors, etc., i.e., anyone who needs remote access to cloud file shares and applications 706 and/or enterprise file shares and applications 708. The file shares and applications 706, 708 can be the private applications, and can be generally referred to as resources. The cloud file shares and applications 706 are located in the cloud such as in the data center 610 whereas the enterprise file shares and applications 708 are located within an enterprise's internal network. Note, while described as file shares and applications 706, 708, each could only be file shares or applications, i.e., these are generalized to denote something accessible by users. Again, conventional access techniques rely on VPNs to the data center 610 or the enterprise's internal network, with all of the resulting issues previously discussed. Also, the virtual private access network 700 includes a central authority 710 for policy configuration and the like. The virtual private access network 700 further includes lightweight connectors 712 at the file shares and applications 706, 708.

The virtual private access is a new technique for the users 702 to access the file shares and applications 706, 708, without the cost, hassle or security risk of VPNs, which extend network access to deliver app access. The virtual private access decouples private internal applications from the physical network to enable authorized user access to the file shares and applications 706, 708 without the security risk or complexity of VPNs. That is, virtual private access takes the "Network" out of VPNs.

In the virtual private access network 700, the users 702, the file shares and applications 706, 708, and the central authority 710 are communicatively coupled to the security cloud 602 (or the distributed security system 100, the cloud system 500, etc.), such as via the Internet 104 or the like. On the client side, at the users 702, the applications 600 provision both secure remote access and optionally accessibility to the security cloud 602. The application 600 establishes a connection to the closest cloud node 102 in the security cloud 602 at startup and may not accept incoming requests.

At the file shares and applications 706, 708, the lightweight connectors 712 sit in front of the applications. The lightweight connectors 712 become the path to the file shares and applications 706, 708 behind it, and connect only to the security cloud 602. The lightweight connectors 712 can be lightweight, ephemeral binary, such as deployed as a virtual machine, to establish a connection between the file shares and applications 706, 708 and the security cloud 602, such as via the closest cloud node 102. The lightweight connectors 712 do not accept inbound connections of any kind, dramatically reducing overall threat surface. The lightweight connectors 712 can be enabled on a standard VMware platform; additional lightweight connectors 712 can be created in less than 5 seconds to handle additional application instances. By not accepting inbound connections, the lightweight connectors 712 make the file shares and applications 706, 708 "dark," removing a significant threat vector.

Policy is established and pushed by policy engines in the central authority 710 (e.g., the authority node 120), such as via a distributed cluster of multi-tenant policy engines that provide a single interface for all policy creation. Also, no data of any kind transits the policy engines. The cloud nodes 102 in the security cloud stitch connections together, between the users 702 and the file shares and applications 706, 708, without processing traffic of any kind. When the user 702 requests an application in the file shares and applications 706, 708, the policy engine delivers connection information to the application 600 and app-side cloud nodes 102 which includes the location of a single cloud nodes 102 to provision the client/app connection. The connection is established through the cloud nodes 102, and is encrypted with a combination of the customer's client and server-side certificates. While the cloud nodes 102 provision the connection, they do not participate in the key exchange, nor do they have visibility into the traffic flows.

Advantageously, the virtual private access provides increased security in that the file shares and applications 706, 708 are visible only to the users 702 that are authorized to access them; unauthorized users are not able to even see them. Because application access is provisioned through the security cloud 602, rather than via a network connection, the virtual private access makes it impossible to route back to applications. The virtual private access is enabled using the application 600, without need to launch or exit VPN clients. The application access just works in the background enabling application-specific access to individual contractors, business partners or other companies, i.e., the users 702.

§ 8.0 Cloud System for Digital Experience Monitoring

Figure 9:
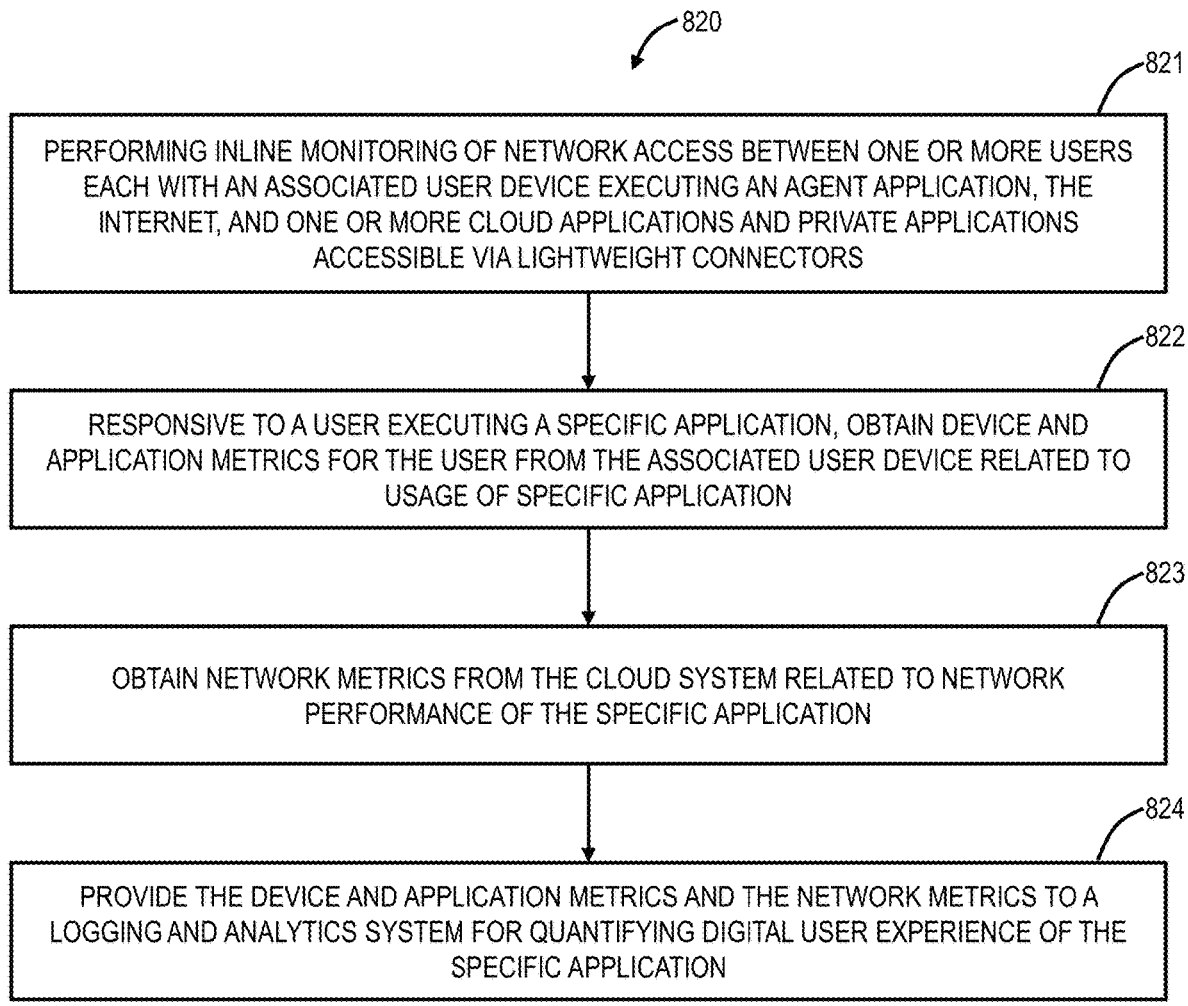
FIG. 9 is a flowchart of a process for digital experience monitoring utilizing the cloud system of FIG. 8.

FIG. 9 is a network diagram of a cloud system 800 for digital experience monitoring. The cloud system 800 brings aspects of FIGS. 1-8 into a single architecture that is leveraged by the systems and methods to provide real-time, continuous digital experience monitoring, as opposed to conventional approaches. A key aspect of the architecture of the cloud system 800 is the inline monitoring. This means data is accessible in real-time for individual users from end-to-end. Accordingly, digital experience monitoring can include monitoring, analyzing, and improving digital user experience.

The cloud system 800 includes a cloud service 802 that connects users (e.g., the regional office 510, the headquarters 520, a mobile device 604 with the application 600, etc.) to applications 706, 708, services, the Internet 504, etc. The cloud service 802 can include the distributed security system 100, the cloud system 500, the security cloud 602, etc. The cloud service 802 can be a proxy or firewall.

End users can be located in the headquarters 520, at the regional office 510, mobile via the mobile device 604, etc. As described herein, an end user has a user device (e.g., a laptop, mobile device, tablet, desktop computer, etc.) that is used to access digital applications or services over the Internet 504 or hosted in public or private infrastructure such as the applications 706, 708 via connectivity to the lightweight connector 712 through the cloud service 802. The applications 706, 708 can be hosted on private or separate infrastructure not directly accessible over the Internet 504.

The cloud service 802 can have cloud edges that are a network service connecting a fixed location where end users work (e.g., the regional office 510, the headquarters 520), to the cloud service 802 to provides security, monitoring, and network services. For example, the cloud edges can include a gateway, a processing node 110, a cloud node 502, etc. As described herein, the application 600 is deployed on the end user's device 604 for connectivity to the cloud service 802 and to provide security, monitoring, and network services. Finally, the cloud system 800 can include logging and analytics 804 either part of or connected to the cloud service 802.

As described herein, a key aspect of the cloud system 800 is the inline, end-to-end visibility of all users. This enables digital experience monitoring. The cloud system 800 has the ability to monitor, diagnose, generate alerts, and perform remedial actions with respect to network endpoints, network components, network links, etc. The network endpoints can include servers, virtual machines, containers, storage systems, or anything with an IP address, including Internet of Things (IoT), cloud, and wireless endpoints. In the cloud system 800, the network endpoints can include the cloud edge or gateway at the headquarters 520, the application 600 in the user device 604, the lightweight connector 712, etc. With these components, these network endpoints can be monitored directly in combination with a network perspective.

Further, network components in the cloud service 802, etc. including routes, switches, and other network devices including Virtualized Network Functions (VNFs) can be monitored along with network links therebetween. The monitoring here can used various probe techniques to measure availability, latency and quality. Also, the applications 706, 708 can also be monitored for performance, etc.

Thus, the cloud system 800 provides a unique architecture that can enable digital experience monitoring, network application monitoring, infrastructure component interactions, etc. Of note, these various monitoring aspects require no additional components—the cloud system 800 leverages the existing infrastructure to provide this service.

Again, digital experience monitoring includes the capture of data about how end-to-end application availability, latency, and quality appear to the end user from a network perspective. This is limited to the network traffic visibility and not within components such as what application performance monitoring (APM) is able to accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud system 800 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like.

The cloud system 800 includes the ability to directly ingest any of the following data sources network device generated health data, network device generated traffic data, including flow-based data sources inclusive of NetFlow and IPFIX, raw network packet analysis to identify application types and performance characteristics, HTTP request metrics, etc. The cloud system 800 can operate at 10 gigabit (10G) Ethernet and higher at full line rate and support a rate of 100,000 flows per second or higher.

§ 8.1 Digital Experience Monitoring

The applications 706, 708 and the SaaS can include enterprise applications, Office 365, Salesforce, Skype, internal applications, etc. These are critical business applications where user experience is important. The objective here is to collect various data points so that user experience can be quantified for a particular user, at a particular time, for purposes of analyzing the experience as well as improving the experience.

In an embodiment, the monitored data can be from different categories including application-related, network-related, device-related (also can be referred to as endpoint-related), protocol-related, etc. Data can be collected at the application 600 or the cloud edge to quantify user experience for specific applications, i.e., the application-related and device-related data. The cloud system 800 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

An example of HTTP Request metrics includes CONNECT, time to first byte/first 10 bytes, time to last byte, Secure Sockets Layer (SSL) handshake time, etc. For example, HTTP can be used to send probes to take measurements as described in commonly-assigned U.S. patent application Ser. No. 16/043,250, filed Jun. 24, 2018, and entitled "Cloud services management systems utilizing in-band communication conveying situational awareness," the contents of which are incorporated by reference herein.

For example, browser triggered data can include collection when a user visits a domain or subnet. The page load performance data can be sampled using the W3C standard HTTP Archive format (HAR). For each session or sample, the agent application 600 can collect: a device fingerprint profile including: 1) IP/DNS configuration (private/public IP, gateway, etc.), 2) Wired or Wi-fi connection (link speed, signal quality, Service Set Identifier (SSID), Basic SSID (BSSID), etc.), 3) VPN config if possible (from routing table, VPN service), 4) Proxy config (cloud or other, parse Proxy Auto Config (PAC) files), and 5) System metrics (CPU, Mem, Swap, bytes in/out etc.). The device fingerprint profile can also include test probes such as a Ping (Internet Control Message Protocol (ICMP)) to discovered gateway, destination, VPN and/or Proxy, and Traceroute (ICMP/Transmission Control Protocol (TCP)) to discovered gateway, destination, VPN and/or Proxy.

Metrics could be combined. For example, device health can be based on a combination of CPU, memory, etc. Network health could be a combination of Wi-Fi/LAN connection health, latency, etc. Application heath could be a combination of response time, page loads, etc. The cloud service 800 can generate service health as a combination of CPU, memory, and the load time of the service while processing a user's request. The network health could be based on the number of network path(s), latency, packet loss, etc.

The lightweight connector 712 can also generate similar metrics for the applications 706, 708. In an embodiment, the metrics can be collected while a user is accessing specific applications that user experience is desired for monitoring. In another embodiment, the metrics can be enriched by triggering synthetic measurements in context of an inline transaction by the application 600 or cloud edge. The metrics can be tagged with metadata (user, time, app, etc.) and sent to the logging and analytics 804 service for aggregation, analysis and reporting. Further, network administrators can get UEX reports from the cloud service 802.

The synthetic measurements can include probes from the agent application 600, the lightweight connector 712, etc. The probes can include HTTP/HTTPS probes, network probes, Voice over IP (VoIP) related probes (e.g., Session Initiation Protocol (SIP), Real Time Protocol (RTP), etc.), DNS probes, Proxy probes, etc. The HTTP/HTTPS probes can configure the URL and interval where the probe is run—it is undesirable to have every device running tests. This can include a configured timeout, website authentication (basic, cert, NTLM), HTTP method (POST, GET, etc), SSL, custom headers, and a configured expected HTTP status code, content (string or Regex).

Due to the inline nature and the fact the cloud system 800 is an overlay (in-between users and services/applications), the cloud system 800 enables the ability to continuously capture user experience metric data and to historically log such data in the logging and analytics 804 service. As such, a network administrator can have a long-term detailed view of the network and associated user experience.

§ 8.2 Process for Digital Experience Monitoring

FIG. 9 is a flowchart of a process 820 for digital experience monitoring utilizing the cloud system 800. The process 820 includes performing inline monitoring of network access between one or more users each with an associated user device executing an agent application, the Internet, and one or more cloud applications and private applications accessible via lightweight connectors (step 821); responsive to a user executing a specific application, obtaining device and application metrics for the user from the associated user device related to usage of specific application (step 822); obtaining network metrics from the cloud system related to network performance of the specific application (step 823); and providing the device and application metrics and the network metrics to a logging and analytics system for quantifying digital user experience of the specific application (step 824).

The process 820 can further include tagging the device and application metrics and the network metrics with metadata for the logging and analytics system to aggregate, analyze, and report. The process 820 can further include obtaining private application metrics related to performance of the private application via the lightweight connector. The agent application can be configured to detect the specific application and cause metric generation based thereon. The cloud system can be a distributed security system with the inline monitoring of all traffic associated with the one or more users such that the cloud system is an overlay network. The process 820 can further enrich the inline monitoring by performing periodic synthetic measurements with inline monitored traffic context between the one or more users, the Internet, and the one or more cloud applications and private applications.

§ 8.3 Digital Experience Analyzing

With the various device, application, and network-related metrics, such as in the logging and analytics 804, it is possible to aggregate these metrics to provide a User Experience (UEX) score. The UEX score can be based on the metrics collected by the application 600, the cloud edge, the cloud service 800, the lightweight connectors 712, etc. The UEX score captures the digital experience and can be based on a given application with associated device, application, and network-related metrics. For example, the UEX score can be determined based on some weighted combination of the device, application, and network-related metrics for a given application and the UEX score can be normalized within a range, e.g., 0 to 100. Again, the given application can be a core business critical application where UEX is important (e.g., Office365, Salesforce, Internal Inventory app, etc.) or any other designated application. The UEX scores can be determined at fixed time epochs (e.g., 15 minute increments, hour increments, etc.) and normalized. Scores can be aggregated for a group of users (e.g. department, location) or for the whole organization. Administrators are provided UEX score reports over time based on user, department, locations, etc. via a Graphical User Interface (GUI). Drilldown reporting capabilities via the GUI allow administrators to identify where there is a problem. For example, administrators can set alerts when a UEX score falls below a threshold. UEX scores for common applications across organizations can be used for peer comparisons and isolating common application issues affecting multiple organizations.

Figure 10:
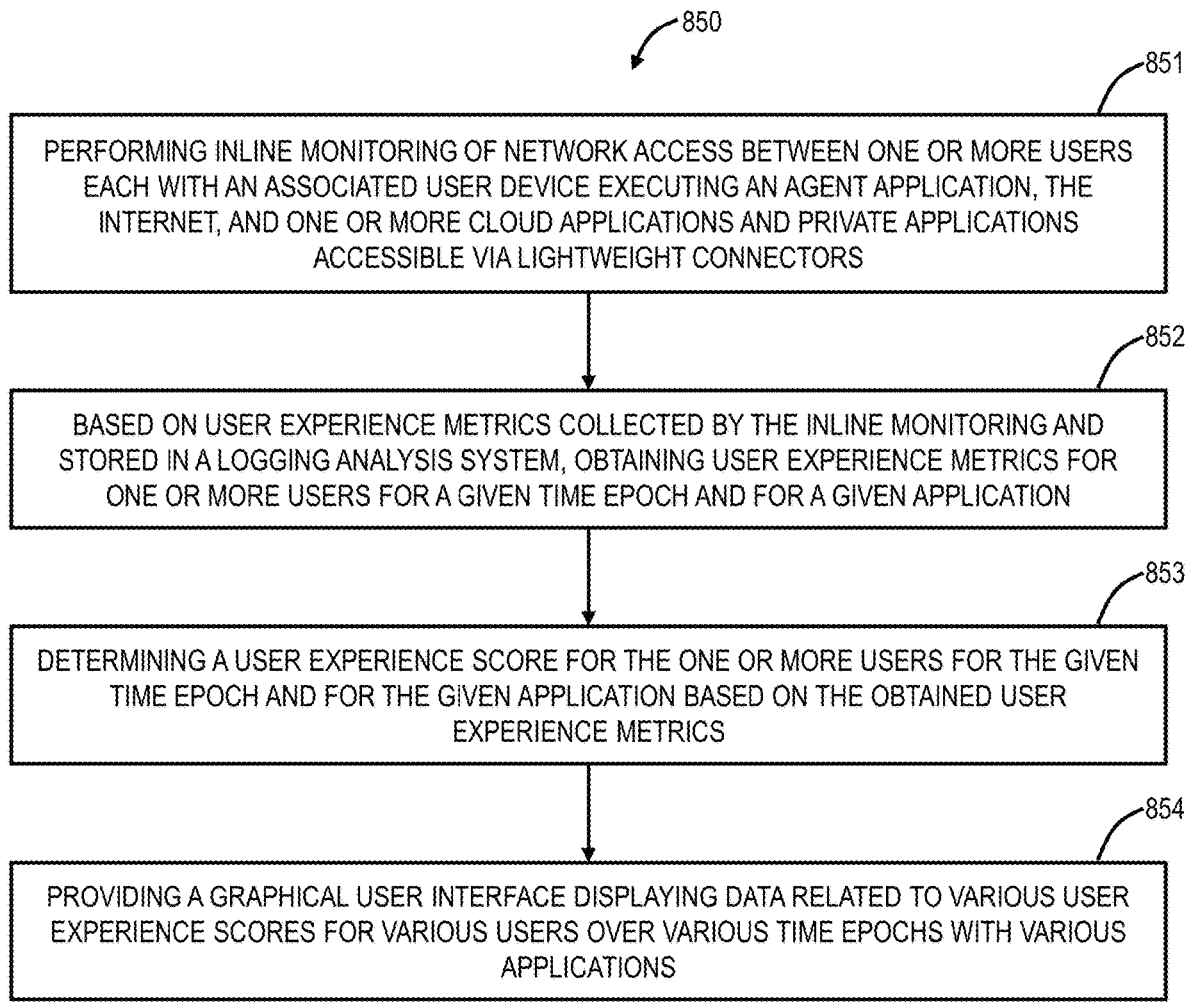
FIG. 10 is a flowchart of a process for analyzing digital user experience.

FIG. 10 is a flowchart of a process 850 for analyzing digital user experience. The process 850 includes performing inline monitoring of network access between one or more users each with an associated user device executing an agent application, the Internet, and one or more cloud applications and private applications accessible via lightweight connectors (step 851); based on user experience metrics collected by the inline monitoring and stored in a logging analysis system, obtaining user experience metrics for one or more users for a given time epoch and for a given application (step 852); determining a user experience score for the one or more users for the given time epoch and for the given application based on the obtained user experience metrics (step 853); and providing a graphical user interface displaying data related to various user experience scores for various users over various time epochs with various applications (step 854).

The process 850 can further include generating and displaying an alert responsive to any user, group of users, location, and organization's user experience score falling below a threshold for a particular time epoch. The process 850 can further include aggregating the user experience for users into groups of users, locations, and organizations, and providing a graphical user interface displaying data related to the groups of users, the locations, and the organizations. The user experience score captures digital experience and is based on a given application with associated device, application, and network-related metrics. The user experience score can be utilized for a specific application for peer comparison, and the process 850 can further include displaying associated user experience scores for the specific application for any users, group of users, locations, and organizations for comparison, and updating the display based on input while a user performs a drill down to remediate poor user experience scores. The process 850 can further include provide additional data including metrics based on input from a user in the graphical user interface.

The various metrics are collected from multiple sources and correlated in the logging and analytics 804 service to come up with a composite UEX score. Again, the sources of the metrics can include application HTTP/S traffic, browser page load times or app specific metrics provide by app vendors APIs/logs; network measurements provided by traceroute tools such as MTR; User Device system metrics (CPU, memory, etc.); cloud tunnel metrics to provide network hops trace between user device and cloud node 502 (inside tunnel); lightweight tunnels 712, etc.

Again, the UEX score is determined in the context of a specific application. For example, a computation can include a point system, e.g., 0-10 (10 being the worst). The points can be allocated based on where the user falls within a percentile threshold (e.g., p80), p100 being the worst UEX. Metrics can be weighted, e.g., Latency=4 pts., % CPU=1 pts. For an application and location, calculate average score based on users that are using the application at the location. The overall score is computed based on average UEX score across all users. For example, in the score card below on scale of 0 (best)-10 (worst), John's score is 2.5 (or 75/100).

| Salesforce.com: threshold p80 | | | |
|---|---|---|---|
| John Doe | User Percentile | Points | Earned |
| Pageload | p90 | 4 | 2 |
| Latency | p70 | 3 | 0 |
| % CPU | Median | 1 | 0 |
| Metric X | p85 | 2 | 0.5 |
| | Total | 10 | 2.5 <= UEX |

§ 8.4 Digital Experience GUI

Figure 13:
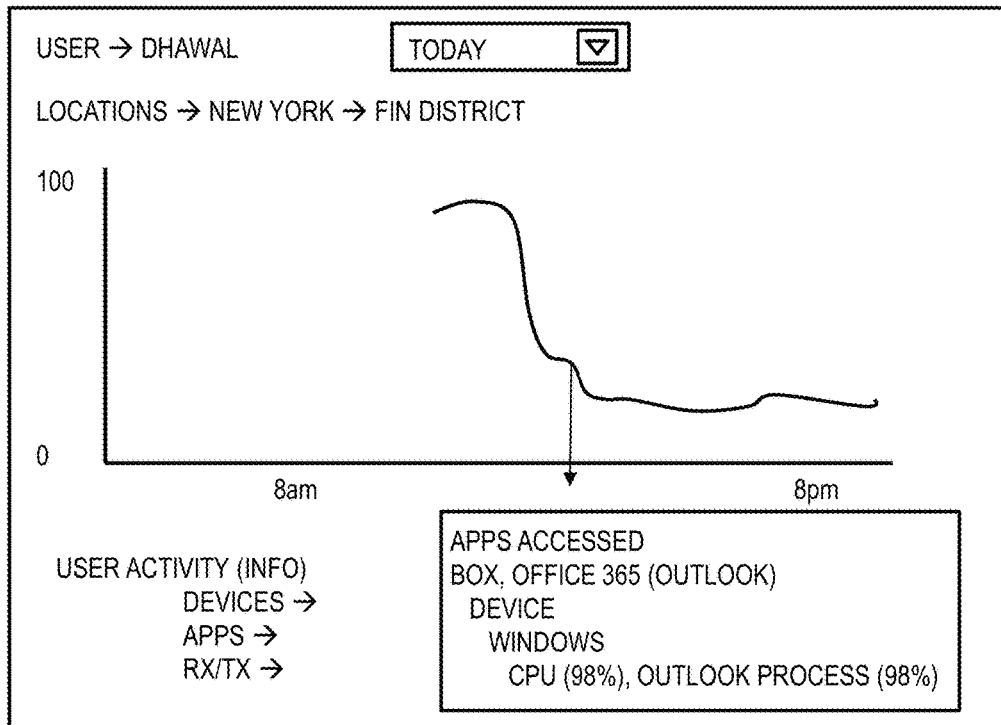
Figure 14:
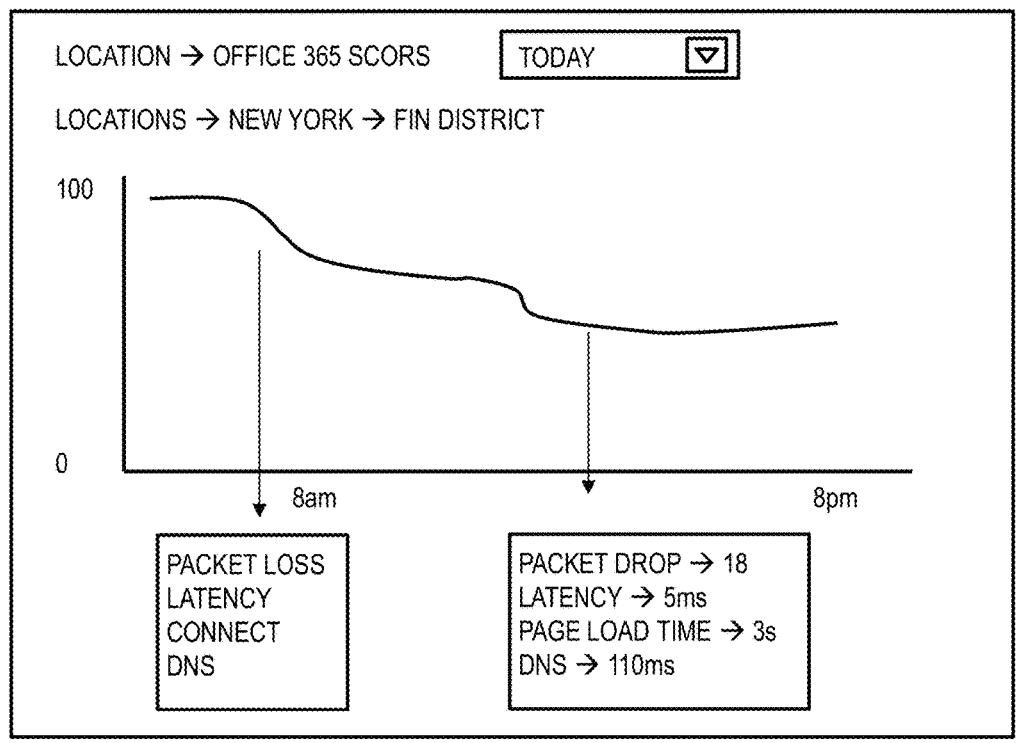

FIGS. 11-24 are various screenshots of a Graphical User Interface (GUI) associated with the analysis service to display, report, and provide a drill down of the User Experience (UEX) scores. FIG. 11 illustrates a GUI listing locations broken down showing an average score of all users at a location. FIG. 12 illustrates a GUI listing a specific location showing users, their UEX scores, a change in UEX score (e.g., over given time epochs), and impacted applications. FIG. 13 illustrates a graph of a specific user's UEX score over time. FIG. 14 illustrates a graph of a specific location's aggregate UEX score over time. Note, a user can drill down on the graph to display data at particular times when the score is low for troubleshooting.

Figure 15:
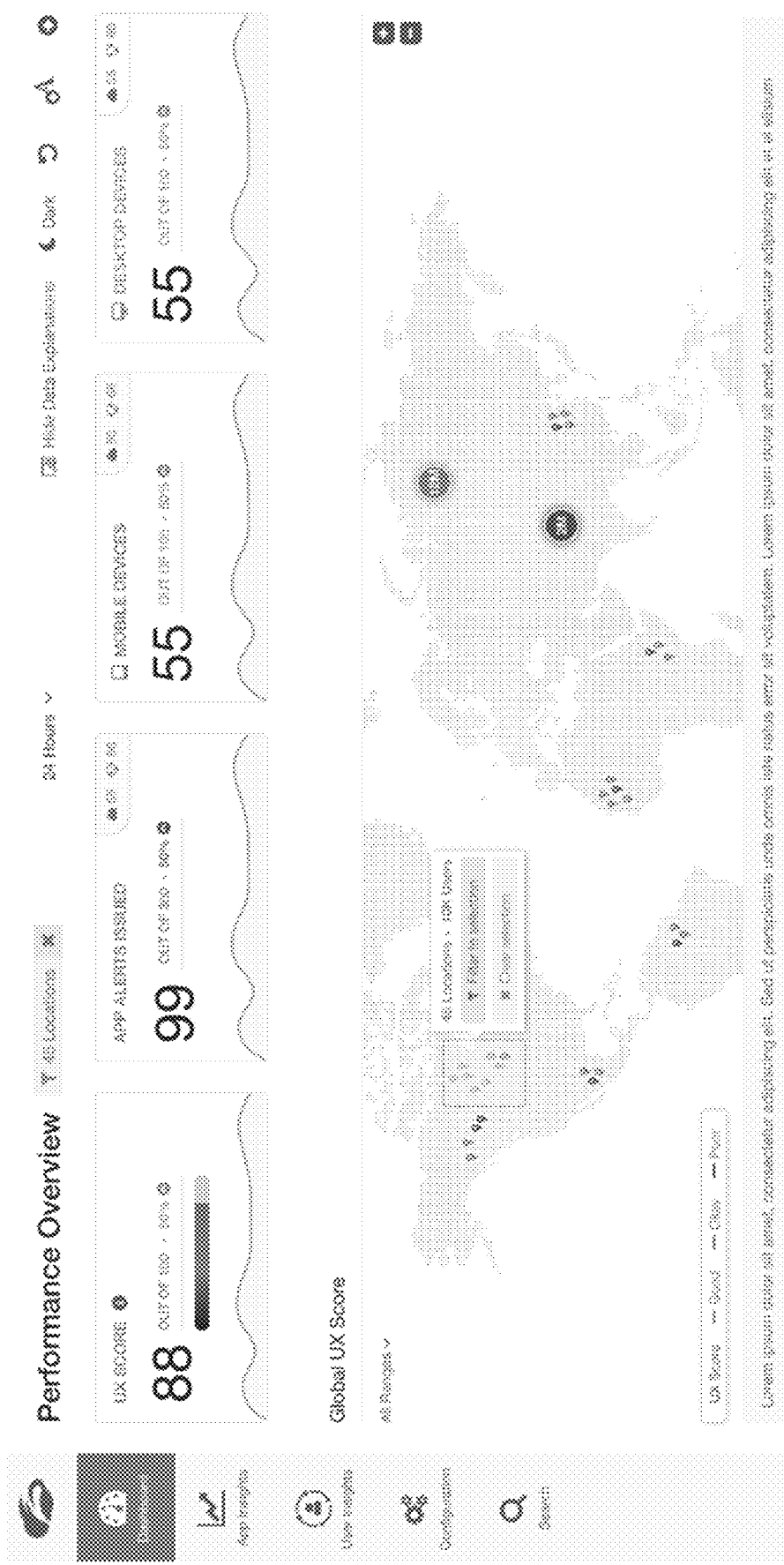

FIG. 15 is a GUI of a global dashboard for the cloud system 800. Here, the aggregate UEX score is displayed (all users). There is a listing of application alerts (e.g., threshold crossings), mobile devices, desktop devices, etc. A map displays the global UEX score using color codes for visual indication of locations with good, okay, and poor UEX scores. Again, this visualization can be used for drill down and remediation.

Figure 16:
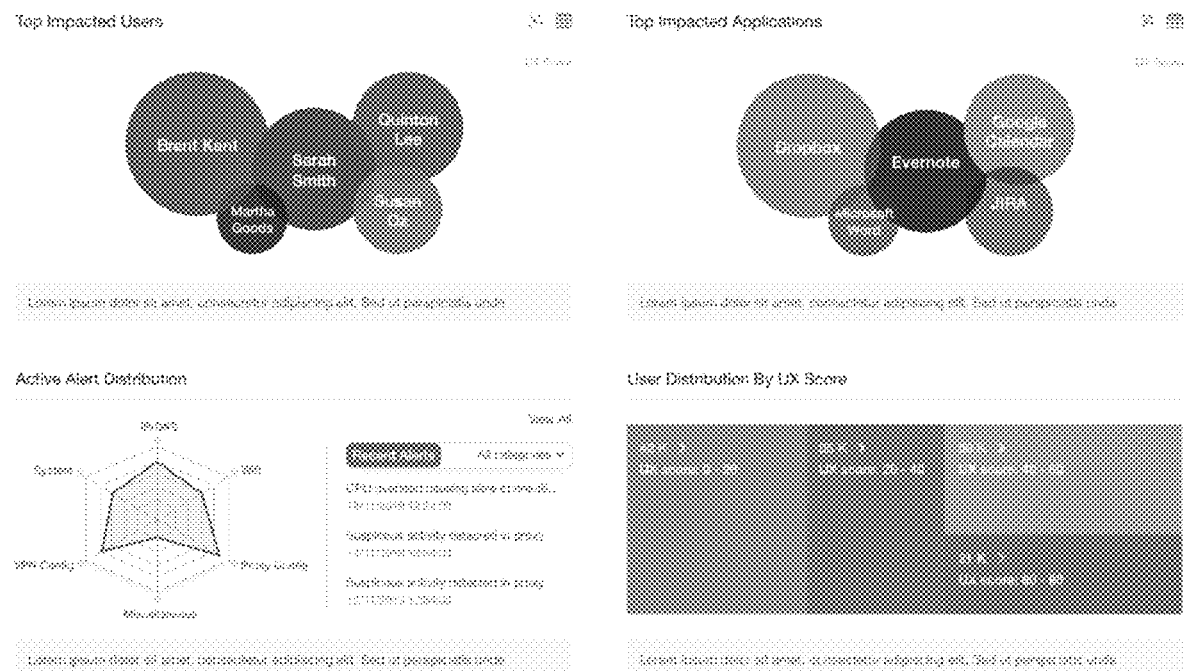
Figure 17:
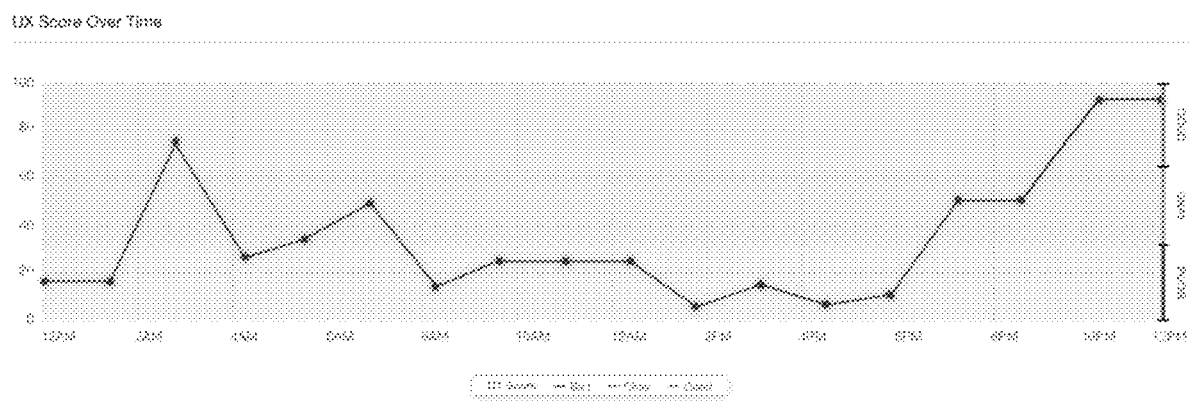
Figure 18:
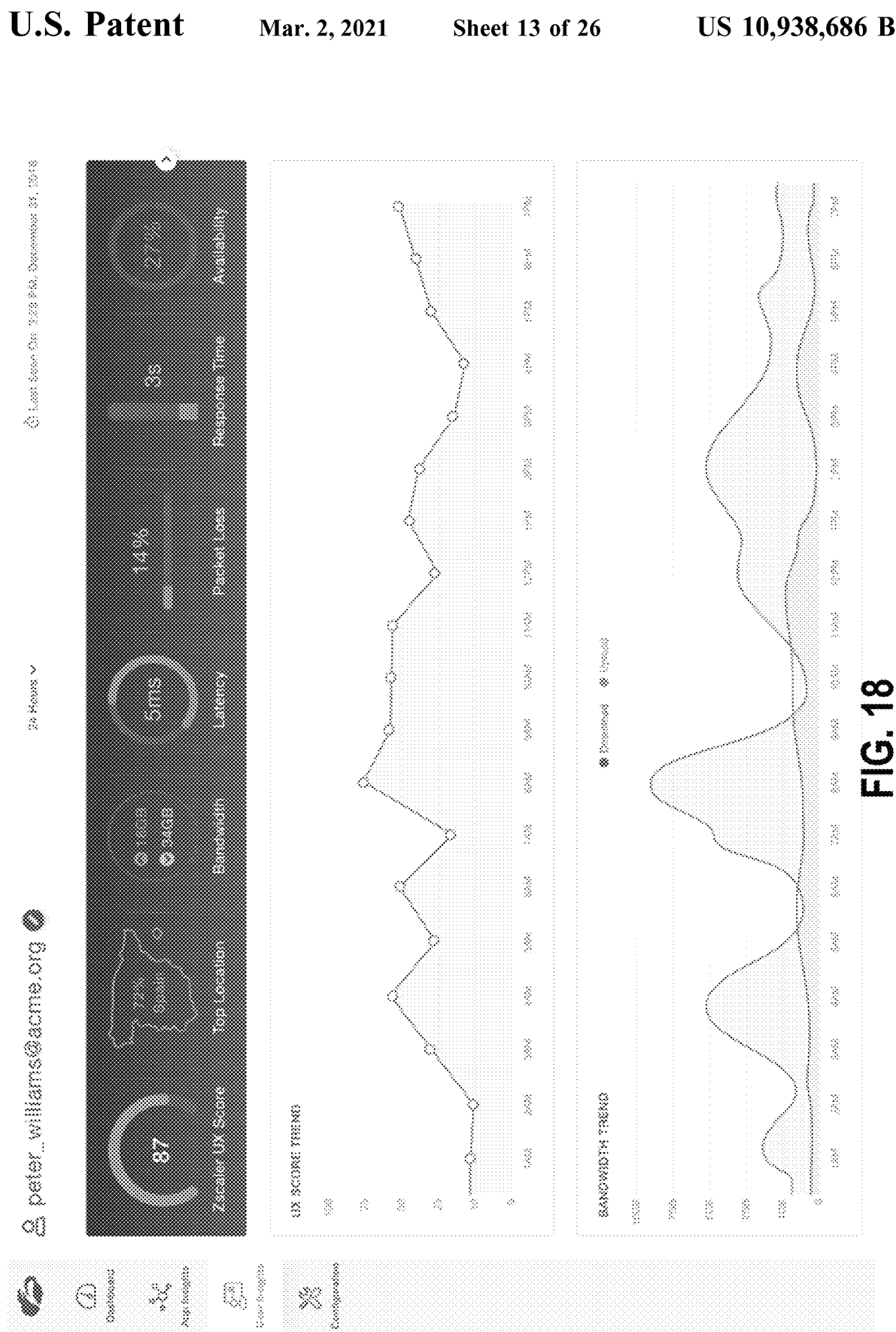
Figure 19:
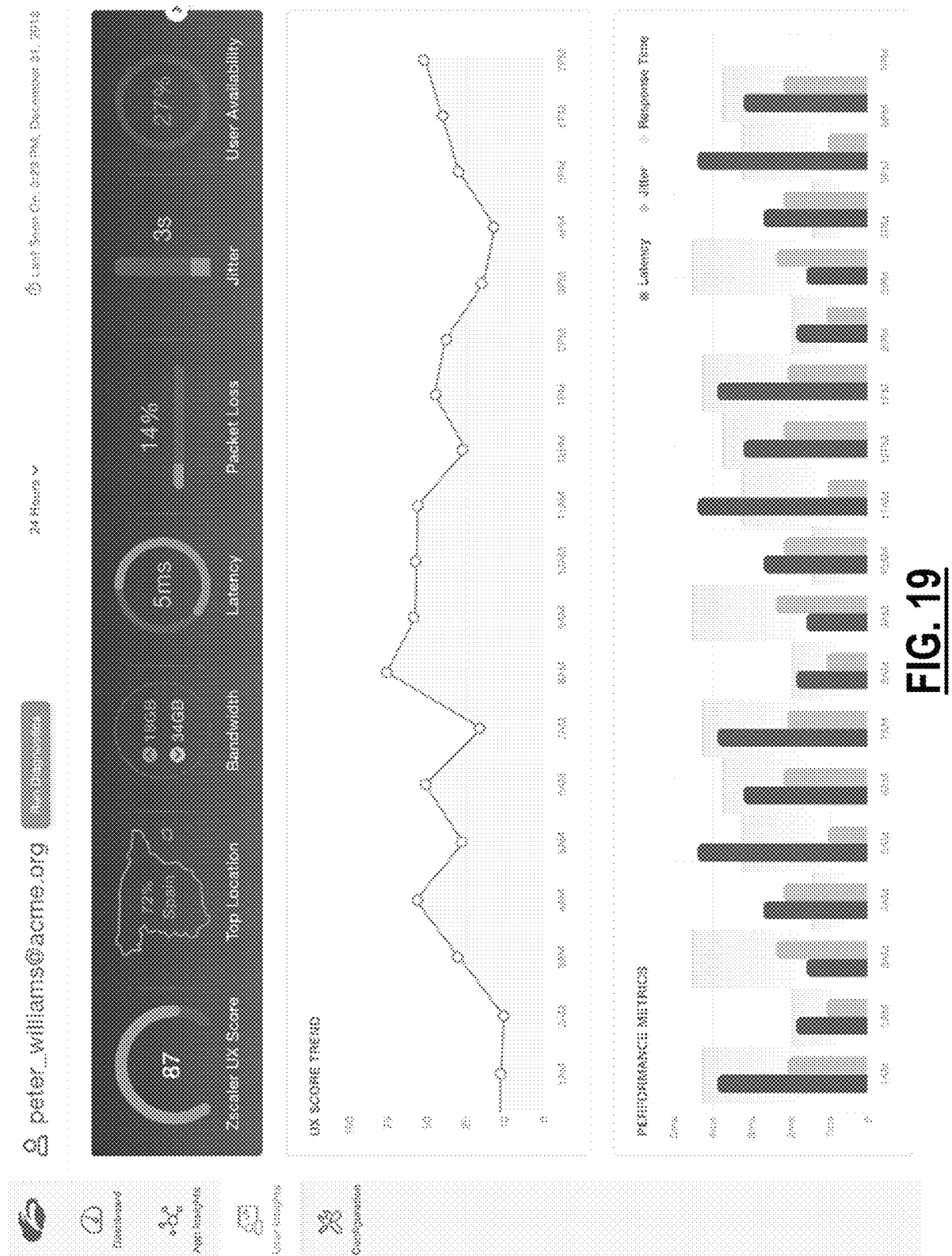

FIG. 16 is a GUI of times in the global dashboard displaying top impacted users, top impacted applications, active alert distribution, and user distribution by UEX score. FIG. 17 is a GUI of a graph of UEX score over time. FIGS. 18 and 19 are a GUI of a dashboard for an individual user. Specifically, the UEX score, location, bandwidth, latency, packet loss, response time, and availability are displayed as are graphs of the UEX score over time and bandwidth for the user in FIG. 18. FIG. 19 includes a graph of various performance metrics over time. Note, the lower performance metrics correlate to lower UEX score.

Figure 20:
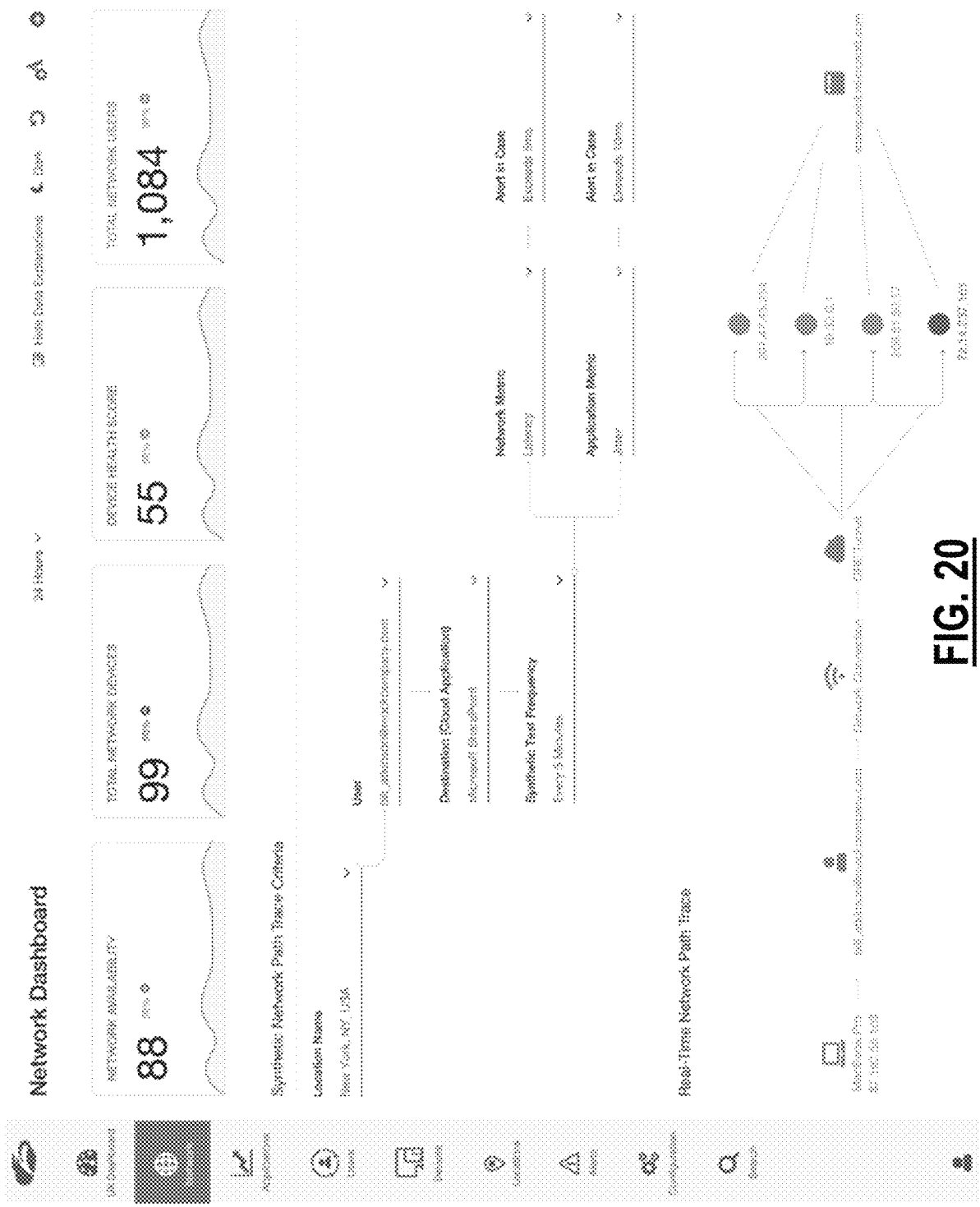

FIG. 20 is a GUI of a network dashboard. This provides a network availability metric similar to the UEX score, a total number of network devices, network device health score which can be similar to the UEX score providing a view of the average network device health, and a total network users. The network dashboard can also include a network path trace criteria which specifies endpoints, destination, users, frequency, metrics, and threshold criteria ("alert in case"). Also, the network dashboard can include a real-time path trace view that illustrates a selected user to a selected application where real-time monitoring occurs which specifies endpoints, destination, users, frequency, metrics, and threshold criteria ("alert in case"). For example, the availability metric can be 100% is GREEN, <100% is RED, Response Time: >5 sec is RED, 3-5 sec is AMBER, <3 sec is GREEN.

Figure 21:
Figure 22:
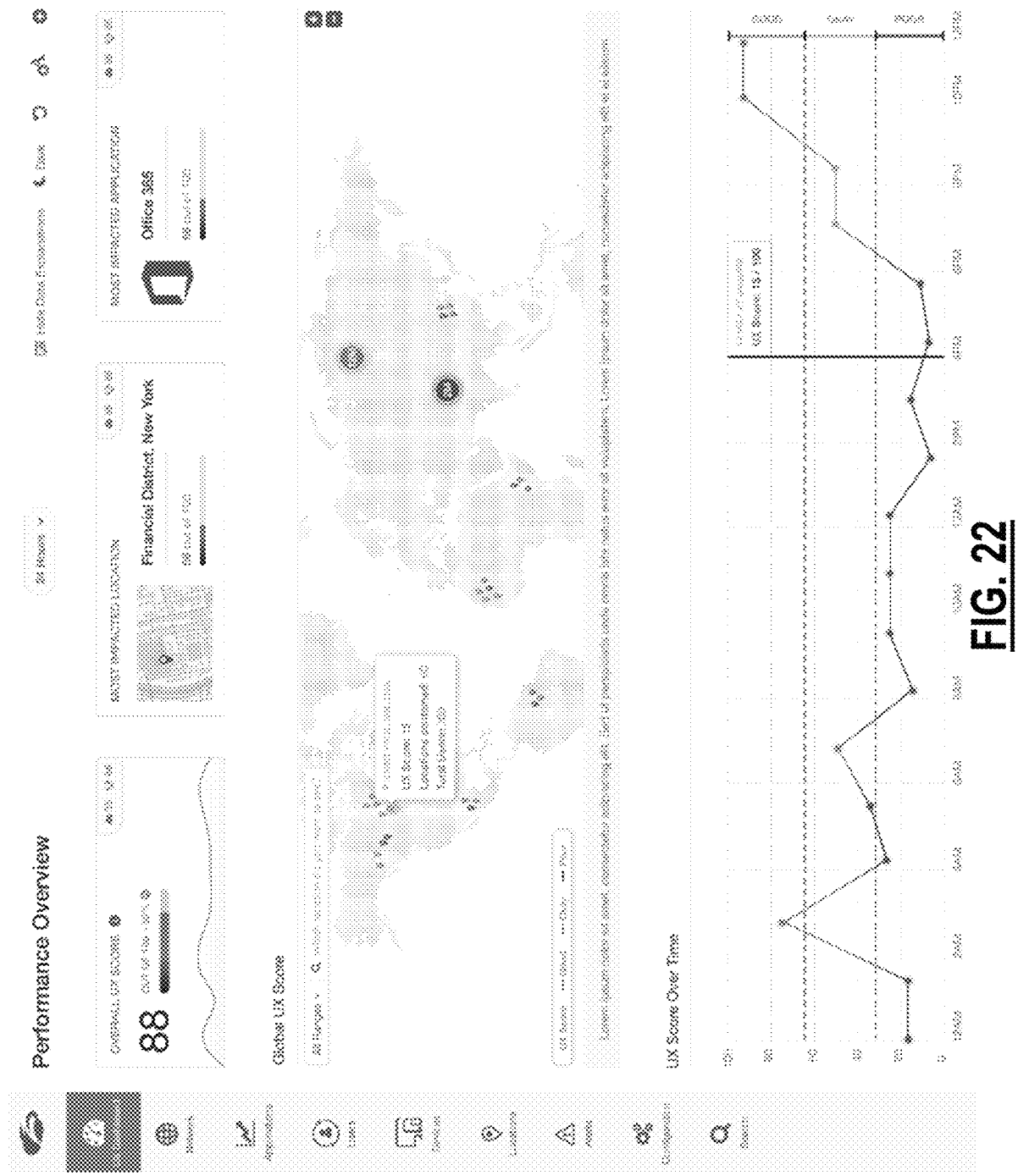
Figure 23:
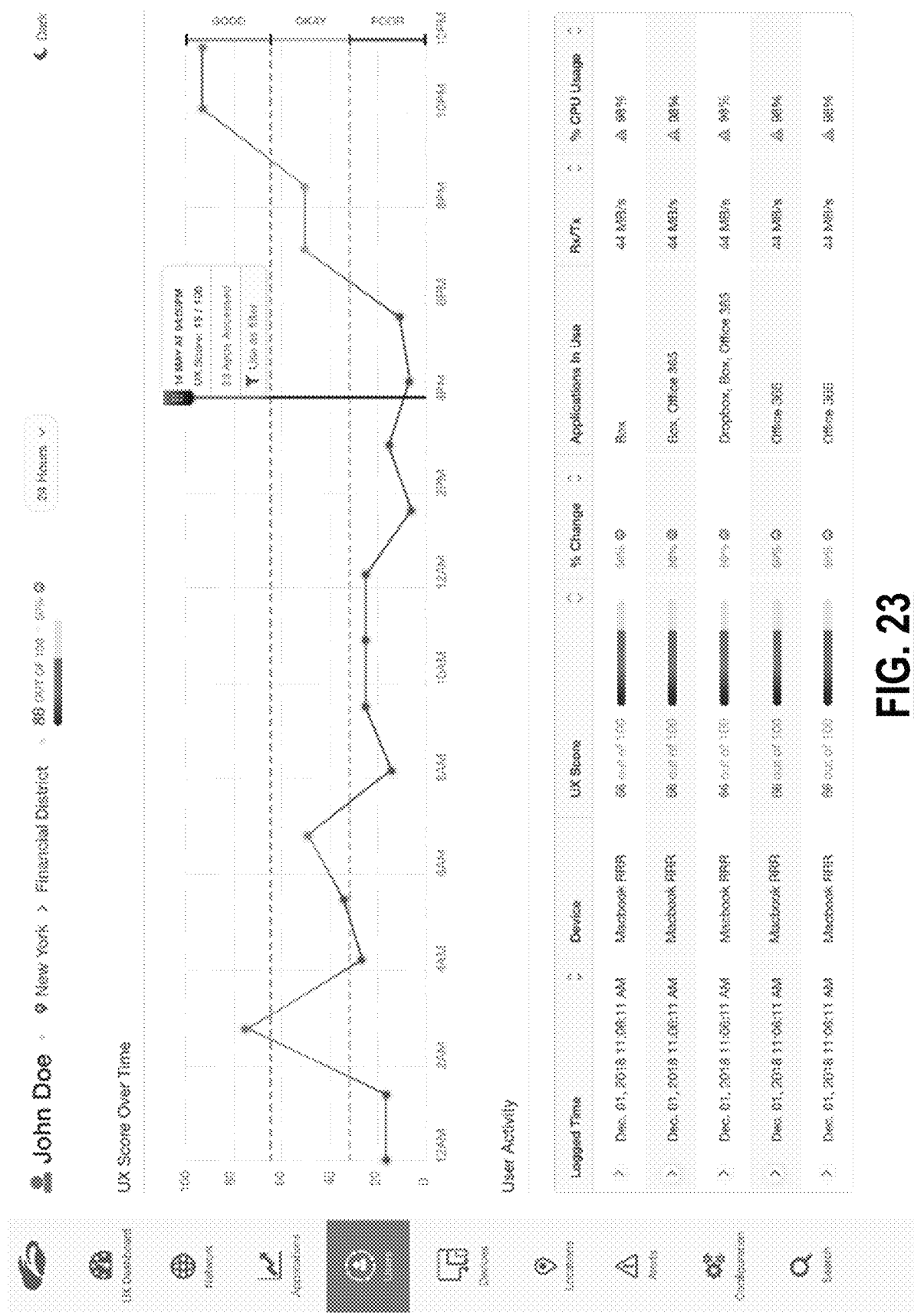
Figure 24:
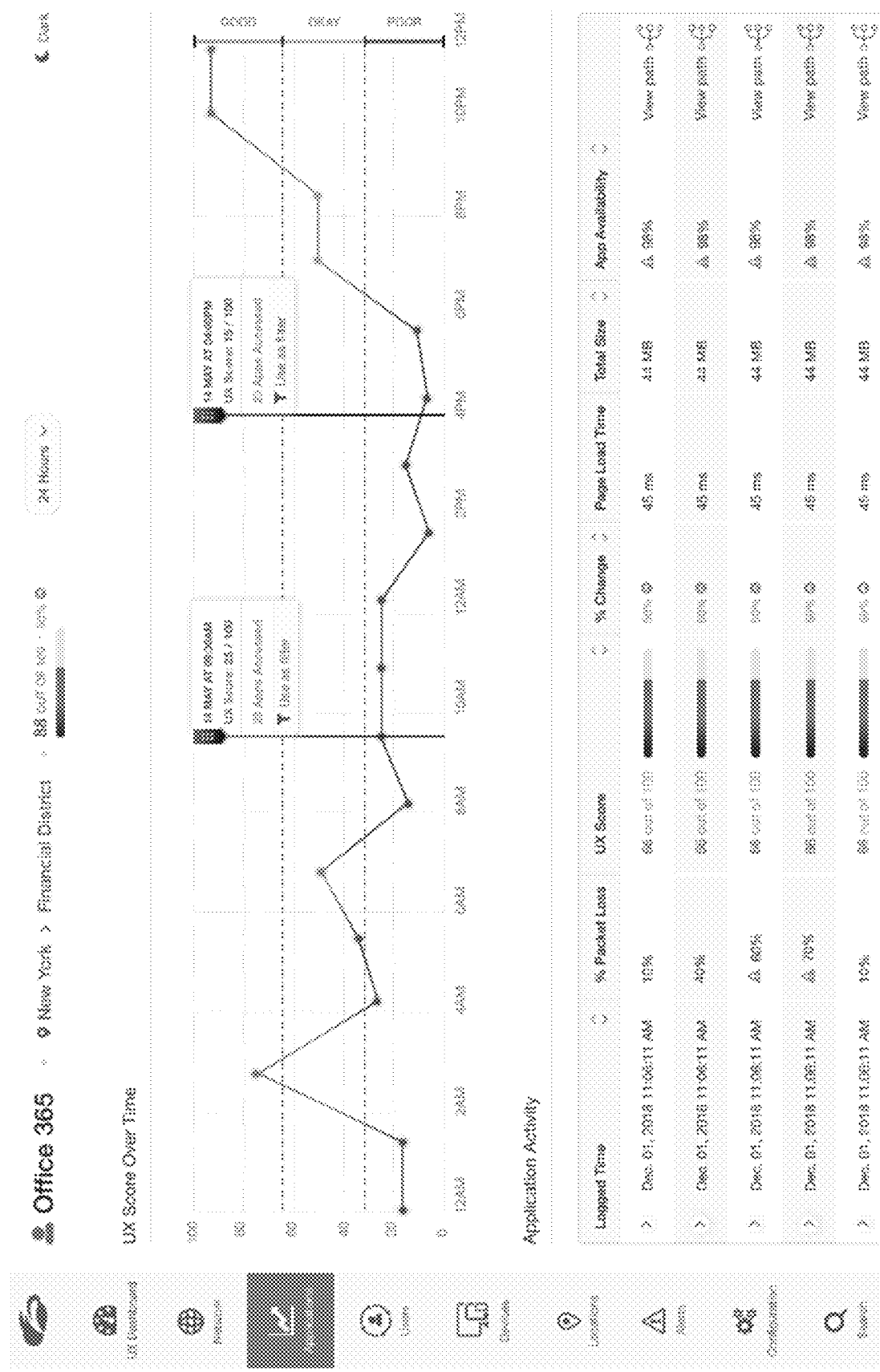

FIG. 21 is a GUI of an alerts dashboard. This includes a number of high severity alerts and a number of application, network, and device alerts. The alerts dashboard further includes a visualization of active alert distribution, a listing of high severity alerts, and a list of the most recent active alerts. FIG. 22 is a GUI of a performance dashboard. This includes the overall UEX score, an indication of the most impacted location and application, a map of global UEX score, and a graph of UEX score over time. FIG. 23 is a GUI of a user dashboard illustrating a single user. FIG. 24 is a GUI of an application dashboard illustrating a single application.

§ 8.5 Improving Digital Experience

With digital user experience monitored and analyzed, it is possible to improve digital user experience in the cloud system 800, in real-time. The objective here is to take the monitored metrics and analyzed UEX score and use it for actionable insights that can improve operation of the cloud system 800 for the purpose of improving the UEX scores, i.e., remedial actions. Here, an analytics service can operate in conjunction with the monitoring service and the analysis service to provide updates to improve the UEX scores in the cloud system 800. For example, these services (the monitoring service, the analysis service, and the analytics service) can operate in the cloud service 800 as one or combined services.

The analytics service can include an Artificial Intelligence (AI)/Machine Learning (ML) anomaly detection engine that can isolate common factors affecting the UEX score. For example, Wi-Fi network coverage could be poor in a location, DNS resolution could be taking too long, there could be network congestion between two Internet Service Provider (ISP) peering points, authentication for an application could be taking an abnormally long time, etc. With the logging and analytics 804, it is possible to review historical data to train the AI/ML anomaly detection engine for ongoing detection.

The analytics service can provide policy based actions to be taken based on the UEX score by the cloud service 802 and/or the organization's IT. For integration with the organization's IT, examples include i) if UEX score falls below threshold, open service ticket with detailed metrics and reports captured, ii) enable granular analysis with packet captures on application 600 based on certain conditions, iii) change tunnel from office to different cloud service providers to improve network path, iv) enable bandwidth controls to provide QoS for a business critical application, etc. Example actions that could be taken by the cloud service 802 include auto scale cloud service resources to improve a performance bottleneck, use the cloud edge to choose better network path, etc.

Figure 25:
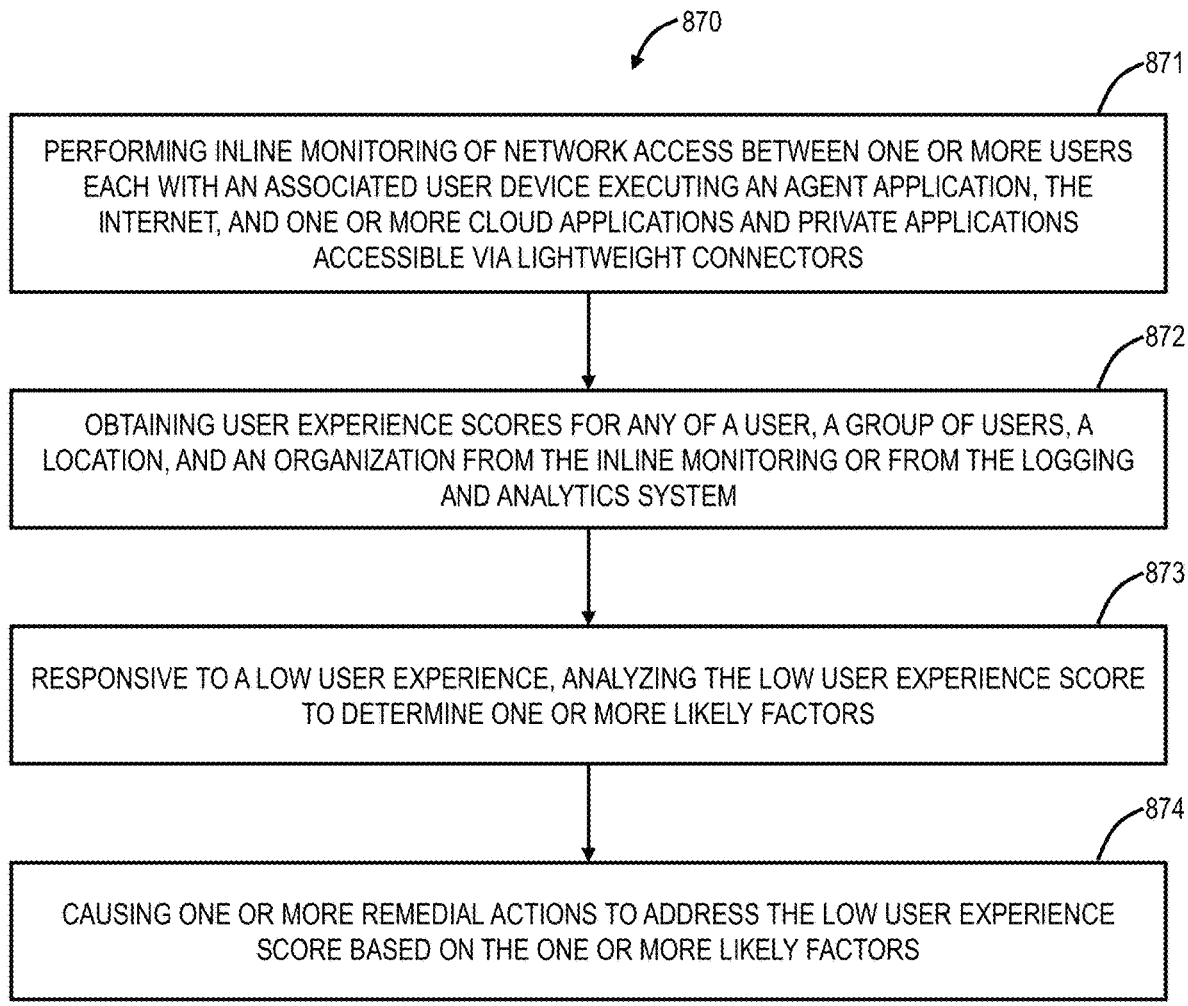
FIG. 25 is a flowchart of a process for improving digital user experience.

FIG. 25 is a flowchart of a process 870 for improving digital user experience. The process 870 includes performing inline monitoring of network access between one or more users each with an associated user device executing an agent application, the Internet, and one or more cloud applications and private applications accessible via lightweight connectors (step 871); obtaining user experience scores for any of a user, a group of users, a location, and an organization from the inline monitoring or from the logging and analytics system (step 872); responsive to a low user experience, analyzing the low user experience score to determine one or more likely factors (step 873); and causing one or more remedial actions to address the low user experience score based on the one or more likely factors (step 874).

The process 870 can further include analyzing user experience scores on one or more of an ongoing basis and a historical basis; determining likely factors in the cloud system, on the associated user device, and in the one or more cloud applications and private applications that cause low user experience scores; and utilizing the determined likely factors in analysis of the low user experience score. The process 870 can further include analyzing user experience scores on one or more of an ongoing basis and a historical basis; and utilizing the analyzed user experience scores to train a machine learning algorithm.

The one or more remedial actions include any of opening of a service ticket with detailed metrics and reports included, causing granular analysis on a user device via the agent application, changing one or more tunnels in the cloud system, and configuring bandwidth controls to adjust priority of a corresponding application. The cloud system can include a plurality of tunnels and tunnels are selected based on the user experience scores for specific users for specific applications. The user experience score captures digital experience and is based on a given application with associated device, application, and network-related metrics.

§ 8.6 Tunnels and Path Selection

Figure 26:
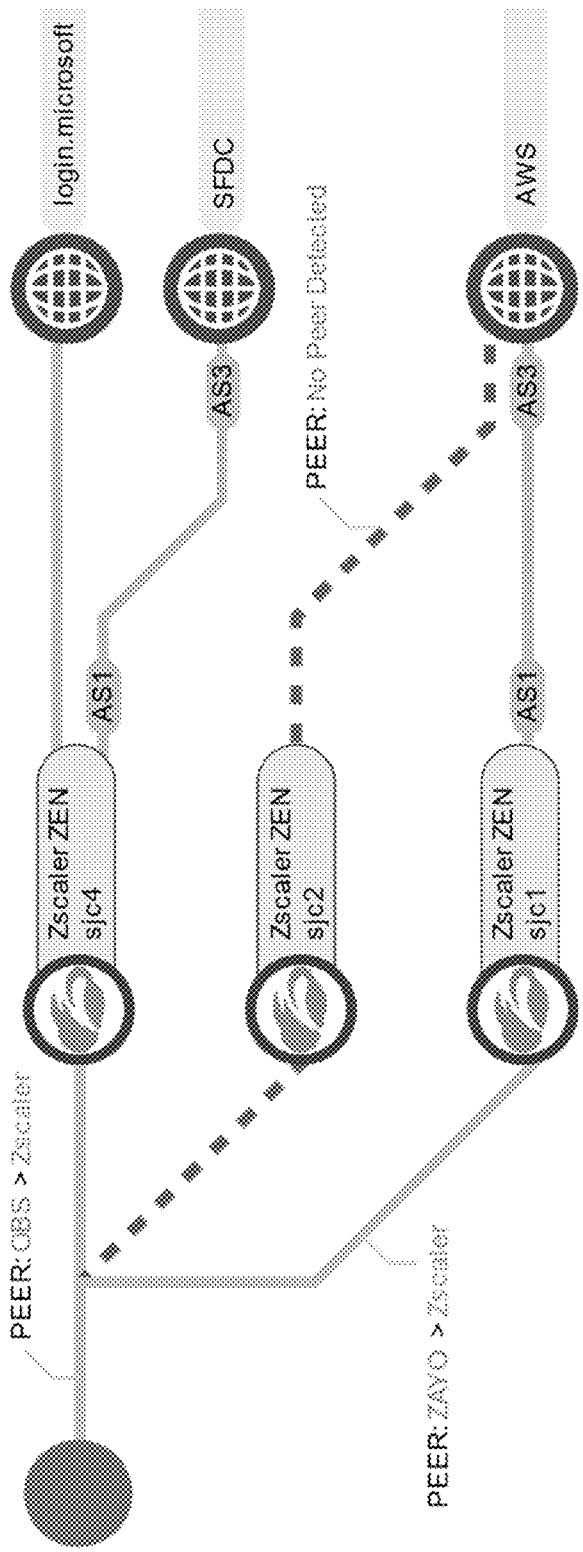
FIG. 26 is a network diagram of selecting the best path from a cloud node to a customer network.

As described herein, connectivity between the end user, the cloud system 800, the Internet, and the applications 706, 708 can be via tunnels, such as using the various protocols described herein. One aspect of remediation for poor UEX scores can include tunnel selection or switching. FIG. 26 is a network diagram of selecting a best path from a cloud node to a customer network. Here, a ZEN node is any of the processing node 110 or cloud node 502. The cloud system 800, via the analytics service, can selected different Autonomous Systems (AS) to connect based on the user experience scores.

Figure 27:
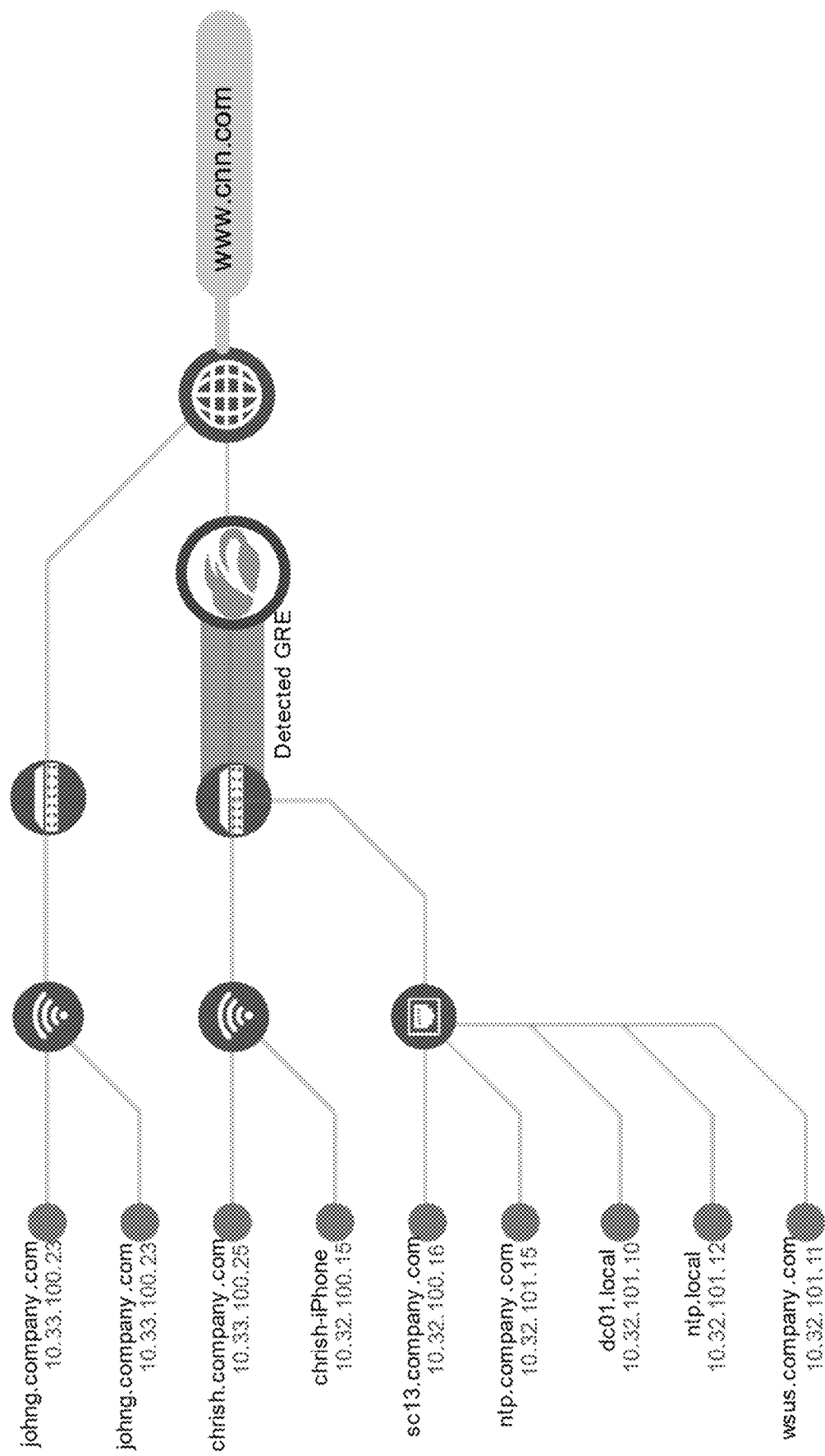
FIG. 27 is a network diagram of selecting the best path between cloud node and a user utilizing the agent application.
Figure 28:
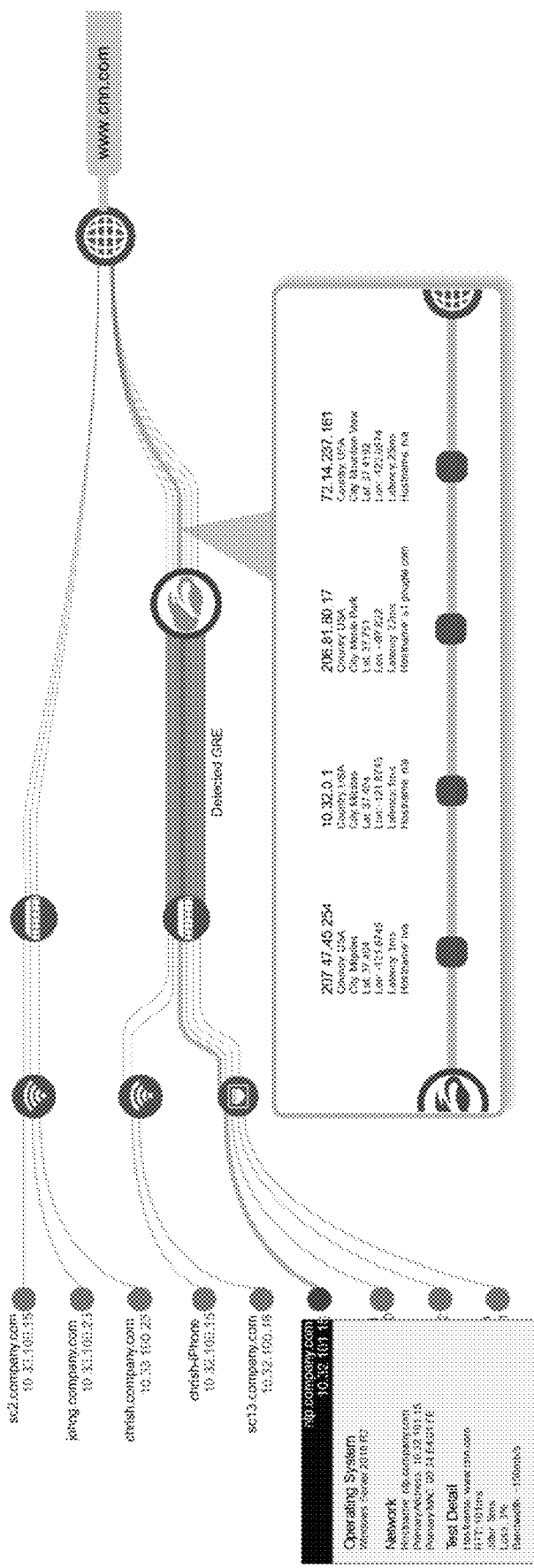
FIG. 28 is a network diagram of a detailed path analysis that is displayed in a GUI.

FIG. 27 is a network diagram of selecting a best path between cloud node and user utilizing the agent application 600. FIG. 28 is a network diagram of a detailed path analysis that is displayed in a GUI. Clicking on a segment of the flow, will open a zoomed view for that segment and a zoomed view will indicate hops and other devices in that path.

§ 8.7 Agent Application Integration and User Workflow

Figure 29:
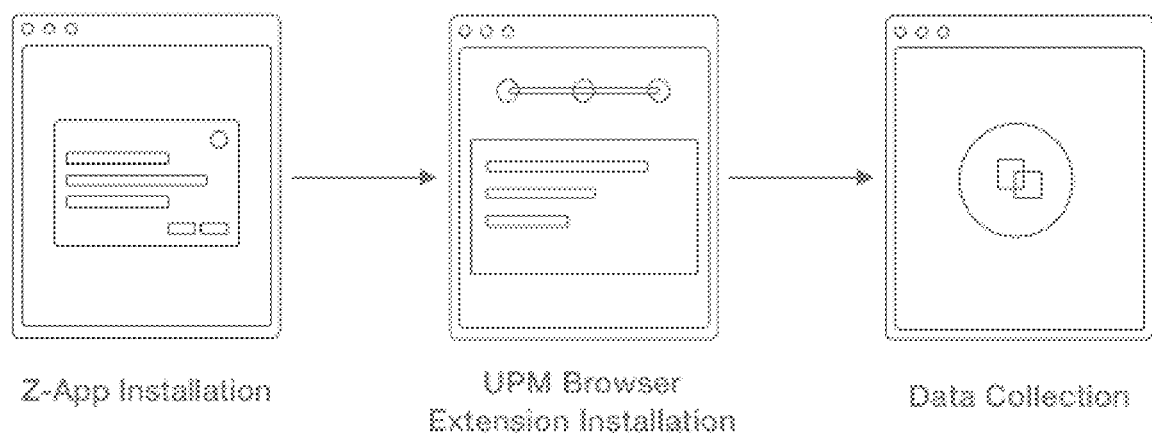
FIG. 29 is a flow diagram of a user workflow with the agent application.
Figure 30:
FIG. 30 is a screenshot of a Web browser illustrating the User Performance Monitoring (UPM) browser extension.

FIG. 29 is a flow diagram of a user workflow with the agent application 600. Here, the agent application 600 ("Z-App") is installed, a User Performance Monitoring (UPM) browser extension can be installed, and data is collected. FIG. 30 is a screenshot of a Web browser illustrating the UPM browser extension.

§ 8.8 Administrator Workflow

Figure 31:
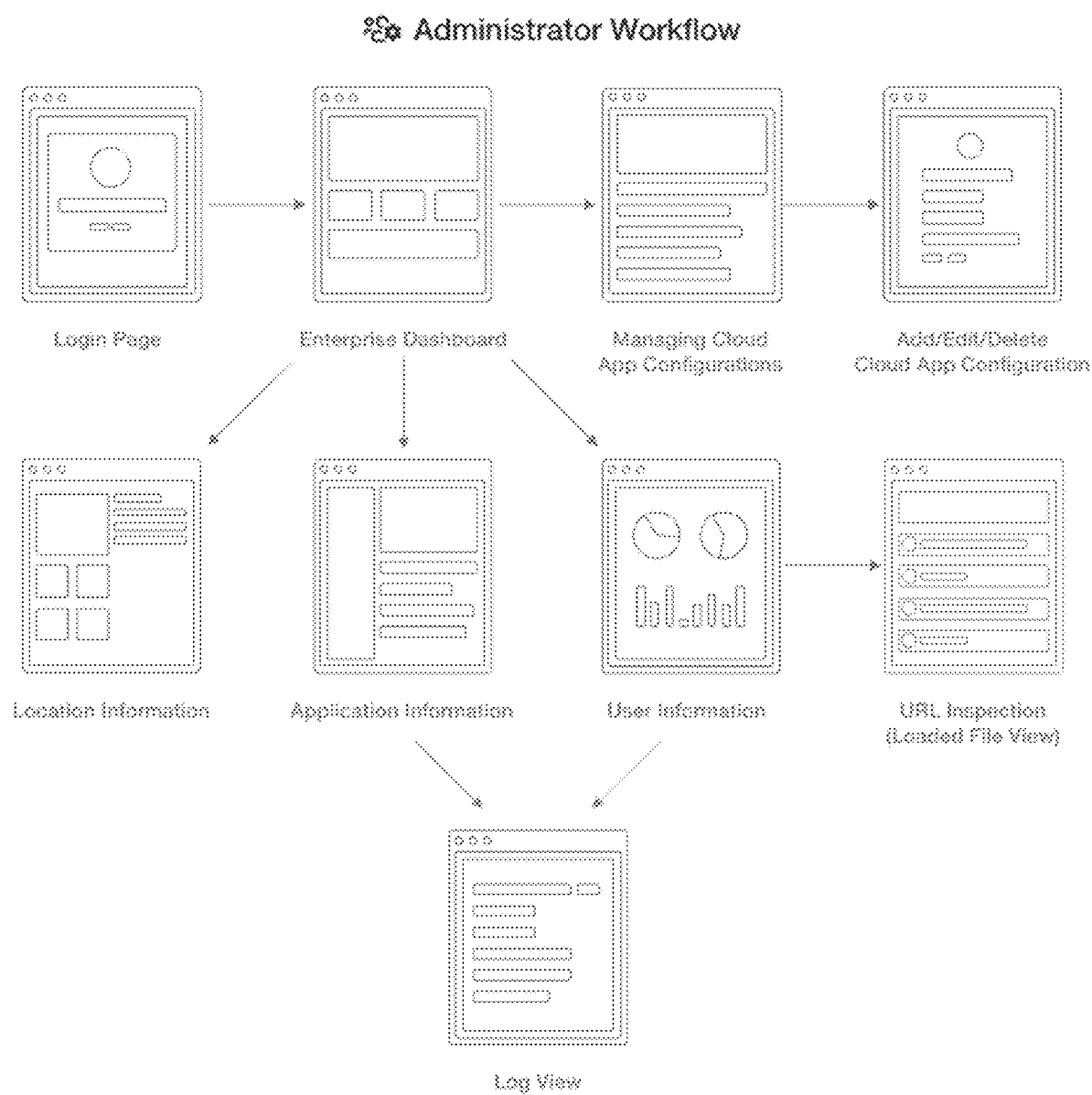
FIG. 31 is a flow diagram of an administrator workflow with the GUI.

FIG. 31 is a flow diagram of administrator workflow with the GUI.

§ 8.9 Monitoring Techniques

In an embodiment, a process includes tracing network path hops encapsulated inside a proxy tunnel by performing tracing from a client computer and routing the trace traffic data into a concentrator system where the hop data is analyzed.

In another embodiment, a process to perform synthetic network probes from end user client endpoint in context of inline real time traffic monitoring at large scale includes deploying randomization techniques to break the stride of probe traffic against a target destination, as to avoid being flagged by destination computer to be blacklisted.

In a further embodiment, a process to calculate a web page load time outside a web browser includes detecting web page document within inline network traffic, tracking all page sub requests and recording load timings for main request and sub requests then forwarding to an analytics system to reassemble the page and subpage requests timings and compute overall page time.

§ 8.10 Use Cases

A first user case can be how is the real user experience accessing key SaaS business applications? This can be determined by measuring performance from the user browser, when the user visits actual pages of key SaaS applications (ex: Office365, salesforce, workday, etc.). The UEX score can be based on page load timings, network delays, and system metrics during user session time frame. The UEX score metrics can be aggregated by geographic location and application to highlight problems based on default or pre-configured thresholds and metric trends (e.g., 90th percentile, mean) to provide an ability to share or save an interactive snapshot of the problem as part of a service escalation.

A second use case can be are there any high network latency or delays to key destinations from user devices— with and without the cloud? This can include scheduling ICMP tests to periodically measure network performance to a discrete network or application domain and reporting My Traceroute (MTR) style metrics (min/max/avg Latency, Jitter, % Loss). This can be measured with and without any proxy and used to display topology flow graph with latency at each hop, aggregate performance metrics by geographic location and application, and highlight problems based on default or pre-configured thresholds to provide an ability to share an interactive snapshot of the problem as part of a service escalation.

A third use case can include are there any high response times to my key web applications from my user devices— with and without the cloud? This can include scheduling a monitor to periodically measure HTTP/S target server response to a specific IP address or domain. This includes an ability to provide authentication login parameters and GET/POST parameters to interact with application (e.g., login, load email), an ability to produce page waterfall timings, etc. This can be measured with and without the cloud or proxy and performance metrics can be aggregated by geographic location and application to highlight problems based on default or pre-configured thresholds and metric trends.

A fourth use case can include wanting to see user device details to troubleshoot system performance and correlate with application and network metrics. This can include scheduling a monitor to periodically collect system performance metrics on the user device, aggregating performance metrics by slower devices, and overlaying user application and network performance with device performance (how's device % CPU and memory usage at time user experienced slowness?). This can highlight problems based on default or pre-configured thresholds to provide the ability to share an interactive snapshot of the problem as part of a service escalation.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A system for analyzing digital user experience comprising:
   a plurality of nodes forming a cloud system, wherein the plurality of nodes are communicatively coupled to i) one or more users each with an associated user device executing an agent application, ii) the Internet, and iii) one or more cloud applications and private applications accessible via lightweight connectors, and wherein the cloud system provides inline monitoring of network access between the one or more users, the Internet, and the one or more cloud applications and private applications;
   a logging and analytics system communicatively coupled to the cloud system configured to log and store user experience metrics collected by the inline monitoring of the cloud system; and
   an analysis service communicatively coupled to the cloud system and the logging and analytics system, wherein the analysis service is configured to
      based on the user experience metrics collected by the cloud system and stored in the logging and analytics system, obtain user experience metrics for one or more users for a given time epoch and for a given application,
      determine a user experience score for the one or more users for the given time epoch and for the given application based on the obtained user experience metrics,
      determine an aggregate user experience score for the cloud system for the given time epoch by combining the user experience score for each of the one or more users for the given time epoch derived from the inline monitoring of the cloud system,
      determine one or more regional user experience scores for the given time epoch by combining the user experience score for users in each of a predetermined region of the cloud system for the given time epoch, and
      provide a graphical user interface displaying data related to various user experience scores for various users over various time epochs with various applications, the data including the aggregate user experience score and the one or more regional user experience scores.

2. The system of claim 1, wherein the analysis service is further configured to
   generate and display an alert responsive to any user, group of users, location, and organization's user experience score falling below a threshold for a particular time epoch.

3. The system of claim 1, wherein the analysis service is further configured to
   aggregate the user experience for users into groups of users, locations, and organizations, and
   provide a graphical user interface displaying data related to the groups of users, the locations, and the organizations.

4. The system of claim 1, wherein the user experience score captures digital experience and is based on a given application with the associated device, application, and network-related metrics.

5. The system of claim 1, wherein the user experience score is utilized for a specific application for peer comparison, and wherein the analysis service is further configured to
   display associated user experience scores for the specific application for any users, group of users, locations, and organizations for comparison, and
   update the display based on input while a user performs a drill down to remediate poor user experience scores.

6. The system of claim 1, wherein the analysis service is further configured to
   provide additional data including metrics based on input from a user in the graphical user interface.

7. The system of claim 1, wherein the given application is one of a cloud application, a Software-as-a-Service application, and a real-time communication application.

8. A cloud node in a cloud system for monitoring digital user experience comprising:
   a network interface communicatively coupled to i) one or more users each with an associated user device executing an agent application, ii) the Internet, and iii) one or more cloud applications and private applications accessible via lightweight connectors;
   a processor communicatively coupled to the network interface; and
   memory storing instructions that, when executed, cause the processor to
      perform inline monitoring of network access between the one or more users, the Internet, and the one or more cloud applications and private applications,
      log and store user experience metrics, collected by the inline monitoring, in a logging and analytics system,
      based on the user experience metrics collected by the inline monitoring and stored in the logging and analytics system, obtain user experience metrics for one or more users for a given time epoch and for a given application,
      determine a user experience score for the one or more users for the given time epoch and for the given application based on the obtained user experience metrics,
      determine an aggregate user experience score for the cloud system for the given time epoch by combining the user experience score for each of the one or more users for the given time epoch derived from the inline monitoring of the cloud system,
      determine one or more regional user experience scores for the given time epoch by combining the user experience score for users in each of a predetermined region of the cloud system for the given time epoch, and
      provide a graphical user interface displaying data related to various user experience scores for various users over various time epochs with various applications, the data including the aggregate user experience score and the one or more regional user experience scores.

9. The cloud node of claim 8, wherein the memory storing instructions that, when executed, further cause the processor to
   generate and display an alert responsive to any user, group of users, location, and organization's user experience score falling below a threshold for a particular time epoch.

10. The cloud node of claim 8, wherein the memory storing instructions that, when executed, further cause the processor to aggregate the user experience for users into groups of users, locations, and organizations, and provide a graphical user interface displaying data related to the groups of users, the locations, and the organizations.

11. The cloud node of claim 8, wherein the user experience score captures digital experience and is based on a given application with associated device, application, and network-related metrics.

12. The cloud node of claim 8, wherein the user experience score is utilized for a specific application for peer comparison, and wherein the memory storing instructions that, when executed, further cause the processor to display associated user experience scores for the specific application for any users, group of users, locations, and organizations for comparison, and update the display based on input while a user performs a drill down to remediate poor user experience scores.

13. The cloud node of claim 8, wherein the memory storing instructions that, when executed, further cause the processor to provide additional data including metrics based on input from a user in the graphical user interface.

14. The cloud node of claim 8, wherein the given application is one of a cloud application, a Software-as-a-Service application, and a real-time communication application.

15. A method comprising:

performing inline monitoring of network access between one or more users each with an associated user device executing an agent application, the Internet, and one or more cloud applications and private applications accessible via lightweight connectors;

log and store user experience metrics, collected by the inline monitoring, in a logging and analytics system;

based on the user experience metrics collected by the inline monitoring and stored in the logging and analytics system, obtaining user experience metrics for one or more users for a given time epoch and for a given application;

determining a user experience score for the one or more users for the given time epoch and for the given application based on the obtained user experience metrics;

determining an aggregate user experience score for the cloud system for the given time epoch by combining the user experience score for each of the one or more users for the given time epoch derived from the inline monitoring of the cloud system;

determining one or more regional user experience scores for the given time epoch by combining the user experience score for users in each of a predetermined region of the cloud system for the given time epoch; and providing a graphical user interface displaying data related to various user experience scores for various users over various time epochs with various applications, the data including the aggregate user experience score and the one or more regional user experience scores.

16. The method of claim 15, further comprising generating and displaying an alert responsive to any user, group of users, location, and organization's user experience score falling below a threshold for a particular time epoch.

17. The method of claim 15, further comprising aggregating the user experience for users into groups of users, locations, and organizations, and providing a graphical user interface displaying data related to the groups of users, the locations, and the organizations.

18. The method of claim 15, wherein the user experience score captures digital experience and is based on a given application with associated device, application, and network-related metrics.

19. The method of claim 15, wherein the user experience score is utilized for a specific application for peer comparison, and further comprising displaying associated user experience scores for the specific application for any users, group of users, locations, and organizations for comparison, and updating the display based on input while a user performs a drill down to remediate poor user experience scores.

20. The method of claim 15, further comprising provide additional data including metrics based on input from a user in the graphical user interface.

* * * * *